(12) United States Patent
Hill

(10) Patent No.: US 11,885,357 B2
(45) Date of Patent: *Jan. 30, 2024

(54) PRESSURE LOCK RETENTION FASTENER

(71) Applicant: Stephen M. Hill, Buckley, WA (US)

(72) Inventor: Stephen M. Hill, Buckley, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,628

(22) Filed: Dec. 8, 2022

(65) Prior Publication Data

US 2023/0109381 A1 Apr. 6, 2023

Related U.S. Application Data

(63) Continuation of application No. 16/360,215, filed on Mar. 21, 2019, now Pat. No. 11,549,538.

(60) Provisional application No. 62/656,909, filed on Apr. 12, 2018.

(51) Int. Cl.
| | |
|---|---|
| *F16B 13/12* | (2006.01) |
| *F16B 13/06* | (2006.01) |
| *F16B 35/00* | (2006.01) |
| *F16B 39/02* | (2006.01) |

(52) U.S. Cl.
CPC .......... *F16B 13/128* (2013.01); *F16B 13/063* (2013.01); *F16B 13/124* (2013.01); *F16B 35/005* (2013.01); *F16B 39/023* (2013.01)

(58) Field of Classification Search
CPC .. F16B 13/063; F16B 13/0833; F16B 13/128; F16B 13/124; F16B 35/005; F16B 39/023
USPC .................... 411/188, 141, 134, 135, 108, 55
See application file for complete search history.

(56) References Cited

U.S. PATENT DOCUMENTS

| | | | |
|---|---|---|---|
| 5,065,490 A | * 11/1991 | Wivagg | ................. G21C 11/08 29/402.09 |
| 5,106,225 A | * 4/1992 | Andre | ................... F16B 5/0233 411/182 |
| 5,259,689 A | 11/1993 | Arand et al. | |
| 7,993,085 B2 | 8/2011 | McClure | |
| 8,075,234 B2 | 12/2011 | McClure | |
| 8,517,650 B2 | 8/2013 | Niklewicz et al. | |
| 10,465,734 B2 | 11/2019 | McClure | |

(Continued)

OTHER PUBLICATIONS

"Non-Final Office Action", U.S. Appl. No. 16/360,215, dated Feb. 3, 2022, 10 pages.

(Continued)

*Primary Examiner* — Gary W Estremsky
(74) *Attorney, Agent, or Firm* — FIG. 1 Patents

(57) ABSTRACT

In implementations of a pressure lock retention fastener, the fastener assembly includes an insert sized for insertion into a fastener hole in a first panel. The fastener assembly has a threaded collet sized to slide in the insert and has expandable flanges that extend below the insert. The expandable flanges are sized for insertion into an aligned hole in a second panel. The fastener assembly also includes a screw installable through the insert to engage the threaded collet. The screw exerts a force that pushes the expandable flanges outward as screw rotation drives the screw into the threaded collet, and ridge locks of the expandable flanges seat up against the second panel effective to fasten the panels together. In implementations, a plate is installable between the panels with slotted holes having anti-rotation tabs that prevent a fastener assembly from spinning in the panel holes.

20 Claims, 13 Drawing Sheets

(56) References Cited

U.S. PATENT DOCUMENTS

| | | |
|---|---|---|
| 10,836,463 B2 | 11/2020 | Mills et al. |
| 11,549,538 B2 * | 1/2023 | Hill ...................... F16B 13/128 |
| 2012/0155969 A1 | 6/2012 | Podesser et al. |
| 2016/0363146 A1 | 12/2016 | Branyon, III et al. |
| 2019/0316621 A1 | 10/2019 | Hill |

OTHER PUBLICATIONS

"Restriction Requirement", U.S. Appl. No. 16/360,215, dated Nov. 18, 2021, 6 pages.

"Final Office Action", U.S. Appl. No. 16/360,215, dated Jul. 18, 2022, 8 pages.

"Notice of Allowance", U.S. Appl. No. 16/360,215, dated Sep. 8, 2022, 5 pages.

\* cited by examiner

PRESSURE LOCK RETENTION FASTENER

RELATED APPLICATIONS

This application claims priority to U.S. patent application Ser. No. 16/360,215 filed Mar. 21, 2019 entitled "Pressure Lock Retention Fastener", the disclosure of which is incorporated by reference herein in its entirety. The U.S. patent application Ser. No. 16/360,215 claims priority to U.S. Provisional Patent Application Ser. No. 62/656,909 filed Apr. 12, 2018 entitled "Pressure Lock Retention Fastener", the disclosure of which is incorporated by reference herein in its entirety.

BACKGROUND

Fastening devices are generally designed to fasten together at least two items or structures, such as to attach a panel to a support structure, or to attach two components of any type of device, structure, or system together. For fasteners that are designed to be inserted through a hole, such as through pre-drilled holes in two panel structures that are being fastened together, access to both sides of the panels is needed to insert a first part of the fastener from one side of the panels and to attach a second part of the fastener from the other side of the panels (or from the other side of one panel). However, there are many situations in manufacturing, construction, and assembly where both sides of two items being fastened together are not accessible for the types of fasteners needed for the application.

SUMMARY

This Summary introduces features and concepts of a pressure lock retention fastener, which is further described below in the Detailed Description and shown in the Figures. This Summary should not be considered to describe essential features of the claimed subject matter, nor used to determine or limit the scope of the claimed subject matter.

Aspects of a pressure lock retention fastener are described. The fastener assembly includes an insert sized for insertion into a fastener hole in a first panel. The fastener assembly has a threaded collet sized to slide in the insert and has expandable flanges that extend below the insert. The expandable flanges are sized for insertion into an aligned hole in a second panel. The fastener assembly also includes a screw installable through the insert to engage internal threads of the threaded collet. The screw exerts a force and pushes the expandable flanges outward as screw rotation drives the screw into the threaded collet. Ridge locks of the expandable flanges seat up against the second panel effective to fasten the panels together. In implementations, a plate is installable between the panels with slotted holes having anti-rotation tabs that prevent the fastener assembly from spinning in the panel holes.

In aspects of the pressure lock retention fastener, a fastener system includes a pressure lock retention fastener to fasten panels together. The pressure lock retention fastener has an insert sized for insertion into a fastener hole in a first panel. The fastener also includes a threaded collet sized to slide in the insert, and the threaded collet has expandable flanges that extend below the insert, where the expandable flanges are sized for insertion into an aligned hole in a second panel. The fastener also includes a screw that is installable through the insert to engage internal threads of the threaded collet. The screw exerts a force that pushes the expandable flanges outward as screw rotation drives the screw into the threaded collet, and ridge locks of the expandable flanges seat up against the second panel effective to fasten the first and second panels together. The fastener system also includes a plate that is installable between the first and second panels, and the plate includes a slotted hole with anti-rotation tabs that engage slots between the expandable flanges of the threaded collet. The anti-rotation tabs of the slotted hole are effective to prevent the pressure lock retention fastener from spinning in the fastener hole of the first panel and in the aligned hole in the second panel.

In aspects of the pressure lock retention fastener, a fastener assembly method includes engaging screw threads of a screw by a threaded collet that slides within an inner void space of an insert, where the screw is installable through the inner void space of the insert and into the threaded collet. The insert is sized for insertion into a fastener hole in a first panel. The fastener assembly method includes pushing expandable flanges of the threaded collet outward by the screw as screw rotation drives the screw into the threaded collet. The expandable flanges extend below the insert and are sized for insertion through an aligned hole in a second panel. The fastener assembly method further includes seating ridge locks of the expandable flanges up against an exterior surface of the second panel effective to fasten the first and second panels together. The ridge locks are positioned against the exterior surface of the second panel by pushing the expandable flanges outward and the threaded collet being drawn up within the insert by the screw rotation.

In other implementations of a pressure lock retention fastener, the fastener assembly includes a receptacle and a screw inserted through a first end of the receptacle. The assembly also includes a pressure lock designed to engage the screw at a second end of the receptacle, where the pressure lock has flanges that each exert a pressure against an interior surface of the receptacle effective to hold the pressure lock and the screw in the receptacle. The assembly is installable into pre-drilled holes through first and second panels to be fastened together. The pressure lock can be unseated from the interior surface of the receptacle effective to extend a portion of the pressure lock through the pre-drilled hole of the second panel. A torque can then be applied to seat the pressure lock up against the second panel effective to fasten the first and second panels together.

In aspects of the pressure lock retention fastener as an assembly, the receptacle is not threaded, allowing insertion of the screw through the center of the receptacle to engage the pressure lock. The pressure lock then holds the screw in the receptacle such that the pressure lock retention fastener is a ready-to-use assembly. In implementations, the flanges of the pressure lock engage a first detent in the second end of the receptacle and exert the pressure against the interior surface of the first detent in the receptacle. Similarly, the flanges of the pressure lock include indented extensions that engage a second detent in the second end of the receptacle and exert the pressure against the interior surface of the second detent in the receptacle.

In aspects of the pressure lock retention fastener being utilized to fasten together two panel structures, the receptacle of the ready-to-use assembly is sized for insertion into the pre-drilled hole through a first panel. The screw can be pushed into the receptacle to unseat the pressure lock from the interior surface of the receptacle, which extends a portion of the pressure lock through the pre-drilled hole of a second panel. The screw can then be rotated to torque the pressure lock up against the second panel. In implementations, the flanges of the pressure lock each include a detent surface that contacts an exterior surface of the second panel around the pre-drilled hole with the pressure lock torqued up against the second panel. The flanges of the pressure lock also include indented extensions that exert pressure against an interior surface of the pre-drilled hole in the second panel effective to hold the pressure lock in place against the second panel. The indented extensions of the flanges can also hold the pressure lock in place against the second panel when the screw is removed from the receptacle.

BRIEF DESCRIPTION OF THE DRAWINGS

Implementations of pressure lock retention fastener are described with reference to the following Figures. The same numbers may be used throughout to reference similar features and components that are shown in the Figures.

DETAILED DESCRIPTION

Figure 1:
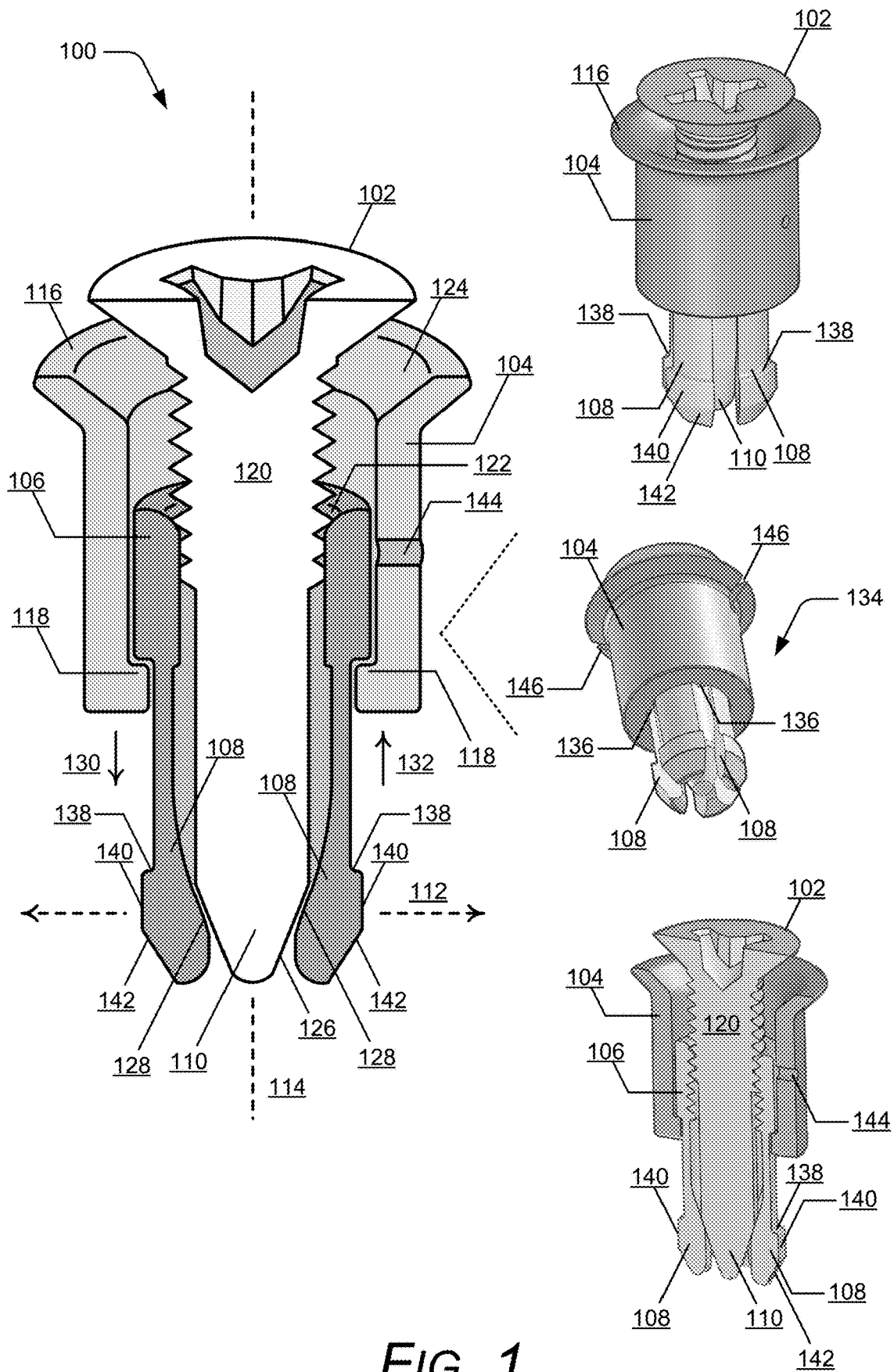
FIG. 1 illustrates an example assembly of a pressure lock retention fastener in accordance with aspects and features of the described fastener assembly.

Implementations of a pressure lock retention fastener are described, and provide a reusable top down blind fastening system that is not only reusable, but can be used in a vertical fashion to fasten or adhere two components together, such as two panels and/or structures, and is deployable top to bottom from one side of the two components. Specifically, in aircraft assembly, the described pressure lock retention fastener is designed to fasten honeycomb panels to underlying structural members, and in particular, without a flange or other component of the fastener requiring installation from the bottom or underside of the panel and structural member. Notably, the pressure lock retention fastener is reusable and designed for applications that require handling higher loads than a rivet system. The pressure lock retention fastener is truly a top-down installable, secure mechanism that is pressure loaded and designed to torque itself, and may be used in any in manufacturing, construction, and assembly application.

Further, the pressure lock retention fastener is designed to be utilized with a variety of materials from high performance plastics, such as carbon fiber, as well as with aluminum, stainless steel, and any variety of materials for different solutions and applications. In implementations, the pressure lock retention fastener can utilize BACS screws and incorporate materials that include PEEK engineered thermoplastic (chemically referred to as polyetheretherketone), Ultem resin, and 17-4 high strength stainless steel, taking into account the specific loads for a project in question. The described pressure lock retention fastener is a fully-customizable solution for each application and situation. For example, the diameter of the screw and other components can be customized for any application, such as for a heavier sheer requirement and/or panel thickness. Likewise, for a thicker structural panel, or even for thinner panels, the pressure lock retention fastener is customizable as-needed, to include envelope requirements (e.g., the physical space within which one has to work for assembly and installation). Notably, the described pressure lock retention fastener can be used for joining light compression materials with dense compression materials, with no adverse effects to the substrates of either piece.

Generally, the pressure lock retention fastener is designed to fasten, attach, or adhere a panel to a structure, a support structure, a rail, and the like. The pressure lock retention fastener can be installed vertical, horizontal, upside down, etc. It is a very versatile fastener mechanism, and for example, a great solution for vertical panels held up over a person's head, where the person can hold the panel up into place and insert fasteners that can be deployed rapidly with an installation gun. Notably, installation of the described pressure lock retention fastener can be automated with a robot and can also be installed in a vertical, horizontal, or upside down position. This is applicable in every industry, including automotive, aerospace, construction, manufacturing, etc.

While features and concepts of a pressure lock retention fastener can be implemented in any number of different devices, systems, environments, and/or configurations, implementations of a pressure lock retention fastener are described in the context of the following example devices, systems, and methods.

FIG. 1 illustrates an example assembly of a pressure lock retention fastener 100 in accordance with aspects and features of the fastener assembly. The pressure lock retention fastener 100 can be pre-assembled and shipped for use as a ready-to-use assembly that includes a screw 102 and an insert 104, as well as a threaded collet 106 with expandable flanges 108 that are designed to expand outward as a smooth pin end 110 of the screw is driven down, forcing the expandable flanges 108 to expand outward. Generally, each of the expandable flanges 108 expands outward (relative to each other) along a horizontal plane 112 that is perpendicular to a vertical plane 114 through a center of the fastener assembly. An internal distance between the expandable flanges 108 increases as the flanges are expanded outward as the screw is rotated down into the threaded collet.

As described in detail below, the insert 104 is formed with an extended edge 116 that is designed to seat flush or recessed into a fastener hole in a first panel that is attached to a second panel, and the insert 104 is sized for insertion into the fastener hole in the first panel. Generally, the insert 104 a has an inner void space down through the insert, as well as a catch ridge 118 that extends inward into the inner void space of the insert. The threaded collet 106 has an outer diameter sized to slide into the inner void space of the insert 104, and the threaded collet 106 is held in place by the catch ridge 118 in the insert. The threaded collet 106 includes the expandable flanges 108 that extend below the insert 104, and the expandable flanges 108 are sized for insertion into an aligned hole in the second panel. In implementations, the first panel includes pre-drilled or pre-stamped fastener holes and the second panel also includes pre-drilled or pre-stamped holes that are aligned with the fastener holes in the first panel.

The screw 102 is installable through the inner void space of the insert 104 and into the threaded collet 106. Notably, the screw 102 is designed with a threaded end 120 that engages (e.g., screws into) the internal threads 122 of the threaded collet 106. The screw 102 is designed with the smooth pin end 110 that is beveled and slides against the expandable flanges 108, exerting a force that pushes the expandable flanges 108 outward as screw rotation drives the screw down into the threaded collet 106, engaging the internal threads 122 of the threaded collet 106.

In this example, the expandable flanges 108, which are also referred to in industry as "tangs" of the threaded collet 106, are spaced at multiple positions extending from the threaded collet, and are designed to expand outward in a deployed state of the fastener assembly. Although the threaded collet 106 is generally shown and described herein as having four expandable flanges 108, the fastener assembly may be implemented with two, three, or more expandable flanges to accommodate the various requirements for different fastening applications. In this illustrated example, the fastener assembly is shown in a non-deployed, ready for installation state, with the screw 102 being held in place partially screwed into the internal threads 122 of the threaded collet 106, and the screw-collet assembly is held in place in the insert 104. The threaded collet 106 and the insert 104 are seated together and ready for installation in the ready-to-use assembly state of the fastener assembly, as shown in FIG. 1.

In implementations of the fastener assembly, the screw 102 is installable through a top end 124 of the insert 104, through the inner void space of the insert and into the threaded collet 106. As noted above, the screw 102 is designed with the beveled surface 126 (of the smooth pin end 110 of the screw), and the beveled surface 126 slides against the inner surfaces 128 of the expandable flanges 108. This exerts an outward force that pushes the expandable flanges 108 outward as the screw rotation drives the screw 102 down into the threaded collet 106, engaging the internal threads 122 of the threaded collet in the insert 104. As the screw 102 is driven down (in reference direction 130), this also draws the threaded collet 106 up (in reference direction 132) within the insert 104. As shown at 134, the insert 104 of the fastener assembly also includes internal tabs 136 that engage and slide in the slots between the expandable flanges 108 of the threaded collet 106. The internal tabs 136 are generally engaged in the respective slots that exist between the expandable flanges 108 effective to prevent the insert 104 and the threaded collet 106 from spinning or turning independently of each other, such as when the screw 102 is torqued down into the threaded collet.

As further shown and described below with reference to FIG. 2, the fastener assembly of the pressure lock retention fastener 100 is installable into pre-drilled holes through first and second panels to be fastened together. The expandable flanges 108 of the threaded collet 106 can be extended through a pre-drilled, fastener hole in a first panel and on through an aligned, corresponding pre-drilled hole in a second panel. Optionally, and as further shown and described with reference to FIG. 2, a plate may be utilized in between the first and second panels that are to be fastened together. Generally, the plate includes slotted holes that align with the pre-drilled holes in the first and second panels. The slotted holes in the plate are designed with anti-rotation tabs that also engage and slide into the slots between the expandable flanges 108 of the threaded collet 106 as the fastener assembly is inserted through the pre-drilled holes in the panels and through a slotted hole in the plate that is installed between the two panels.

The anti-rotation tabs of the slotted holes in the plate engage the respective slots that exist between the expandable flanges 108 effective to prevent the fastener assembly from spinning in the fastener hole of the first panel and in the aligned hole in the second panel, such as when the screw 102 is torqued down. Although generally shown and described as a plate in FIG. 2, the anti-rotation feature may be implemented as a strip (e.g., metal, or other composite) with multiple slotted holes aligned down the strip, or as individual stamped washers or other inserts configured to counter the rotation effect when the screw 102 is torqued down.

As the screw rotation then drives the screw 102 down (in reference direction 130), and the threaded collet 106 is drawn up (in reference direction 132) within the insert 104, ridge locks 138 of the expandable flanges 108 are seated up against the exterior surface of the second panel effective to fasten the first and second panels together. Optionally, as noted above, a plate with slotted holes designed for anti-rotation of the fastener assembly may also be fastened between the first and second panels. The ridge locks 138 of the expandable flanges 108 are a type of pressure lock on the exterior surface of the second panel that is activated by the applied torque to the screw 102 as the screw engages the internal threads 122 of the threaded collet 106 in the insert 104. The screw 102 is rotatable to torque the ridge locks 138 of the expandable flanges 108 up to seat against the exterior surface of the second panel as the threaded collet 106 is drawn up within the insert 104 by the screw rotation.

Notably, the threaded collet 106 is not an expanding nut, but rather, is straight and concentric with the internal threads 122 that smoothly engage screw threads of the threaded end 120 of the screw 102. The screw threads and the internal threads 122 of the threaded collet 106 are concentric, and the screw threads can engage the internal threads of the threaded collet 106 without binding the screw threads in the threaded collet. Generally, the parallel design of the threaded collet 106 and the screw 102 of the fastener assembly reduces or eliminates tension between the threads of both so that they don't bind. As can occur with conventional fastener systems, the screw threads may bind and peel in an implementation that uses an expanding nut with binding pressure, which can lead to degradation of the thread screws and/or degradation of the collet threads in the form of metal shavings that may then interfere with and/or damage surrounding components.

A particular feature of the pressure lock retention fastener 100 is the configuration shape of the lower ends (e.g., that insert into the pre-drilled holes in the panels) of the expandable flanges 108 of the threaded collet 106. As noted above, the lower ends of the expandable flanges 108 have the inner surface 128 on which the beveled surface 126 of the smooth pin end 110 of the screw 102 slides against, exerting the outward force that pushes the expandable flanges 108 outward as screw rotation drives the screw 102 down into the threaded collet 106. The lower ends of the expandable flanges 108 also include the ridge locks 138 that seat up against the exterior surface of the second panel effective to fasten the first and second panels together. The outer surface of the lower end of each expandable flange 108 also includes a preventative false lock surface 140, shown as the straight portion below the ridge lock 138, that leads into a lower, beveled portion 142 of the expandable flange. The lower, beveled portion 142 of the expandable flanges 108 facilitates ease of installation of the fastener assembly into and through the pre-drilled holes in the panels that are to be fastened together with the fastener assemblies.

In this implementation, the preventative false lock surface 140 of the lower ends of the expandable flanges 108 is flat on a parallel plane relative to the center of the fastener assembly, and is curved relative to the circumference shape of the threaded collet 106. The preventative false lock surfaces 140 of the lower ends of the expandable flanges 108 (e.g., the straight, flat portion below the ridge lock 138 and above the lower, beveled portion 142) is designed to prevent the ridge lock 138 from engaging into a void space between the first and second panels. This prevents or eliminates false positive lock engagements, notably preventing an indication that a fastener is installed and seated correctly when-in-fact it has falsely engaged between the two panels, rather than being seated up against the outer, lower exterior of the second panel. As can occur with conventional fastener systems that have a sloping flange without some type of a guide or preventative feature to prevent false positive lock engagements, the lock mechanism of a conventional fastener system may catch in the detent or void space between the first and second panels that are being fastened together, and the misalignment results in the panels not being fastened together.

As also shown in this example assembly of the pressure lock retention fastener 100, the insert 104 may be designed with an air release vent 144 to vent air pressure, such as when air pressure builds up below the panels that are fastened together with the fasteners, and the air pressure can be vented to an open space above the panels. In other similar designs, such as shown at 134, the insert 104 may include one or more air release vents 146 notched in the top of the insert, in addition or as an alternative to the air release vent 144 shown notched in the side of the insert. In implementations, the one or more air release vents 146 that are notched in the top of the insert 104 may also be designed as screwdriver slots that are usable with a flat blade screwdriver to hold and prevent rotation of the insert 104.

The pressure lock retention fastener 100 has the aspects of retention via pressure for deployment of the fastener assembly, which can be deployed as a fastener assembly unit in a robotic or automated process for a true top-down fastener solution. In implementations, multiple pressure lock retention fasteners can be used to build floor panels, such as in an aircraft, with a robot that has an automated belt feed system, where the robot can grasp a ready-to-use assembly of a pressure lock retention fastener 100 in a tool. The robot can grasp the insert 104 of the assembly, use an automatic gluing mechanism to spin the whole fastener around once and apply glue to it, such as on the external, outer diameter of the insert. The robot can then insert the fastener assembly into a prepared, pre-drilled hole in a floor panel with a structural beam underneath the floor panel, and optionally through the metal plate or strips with the slotted anti-rotation holes secured in between the floor panel and the structural beam or track. The floor panel and the structural beam or track are pre-drilled or pre-stamped with holes that are aligned and ready to have an assembly of the pressure lock retention fastener 100 installed, and the fastener assembly can be inserted into the pre-drilled holes and seated with the prescribed amount of glue applied to the insert 104 of the fastener. Notably, the glue feature is optional, but can be used to provide extra strength and customizability for sheer loads and various customer requirements in different fastening applications.

Figure 2:
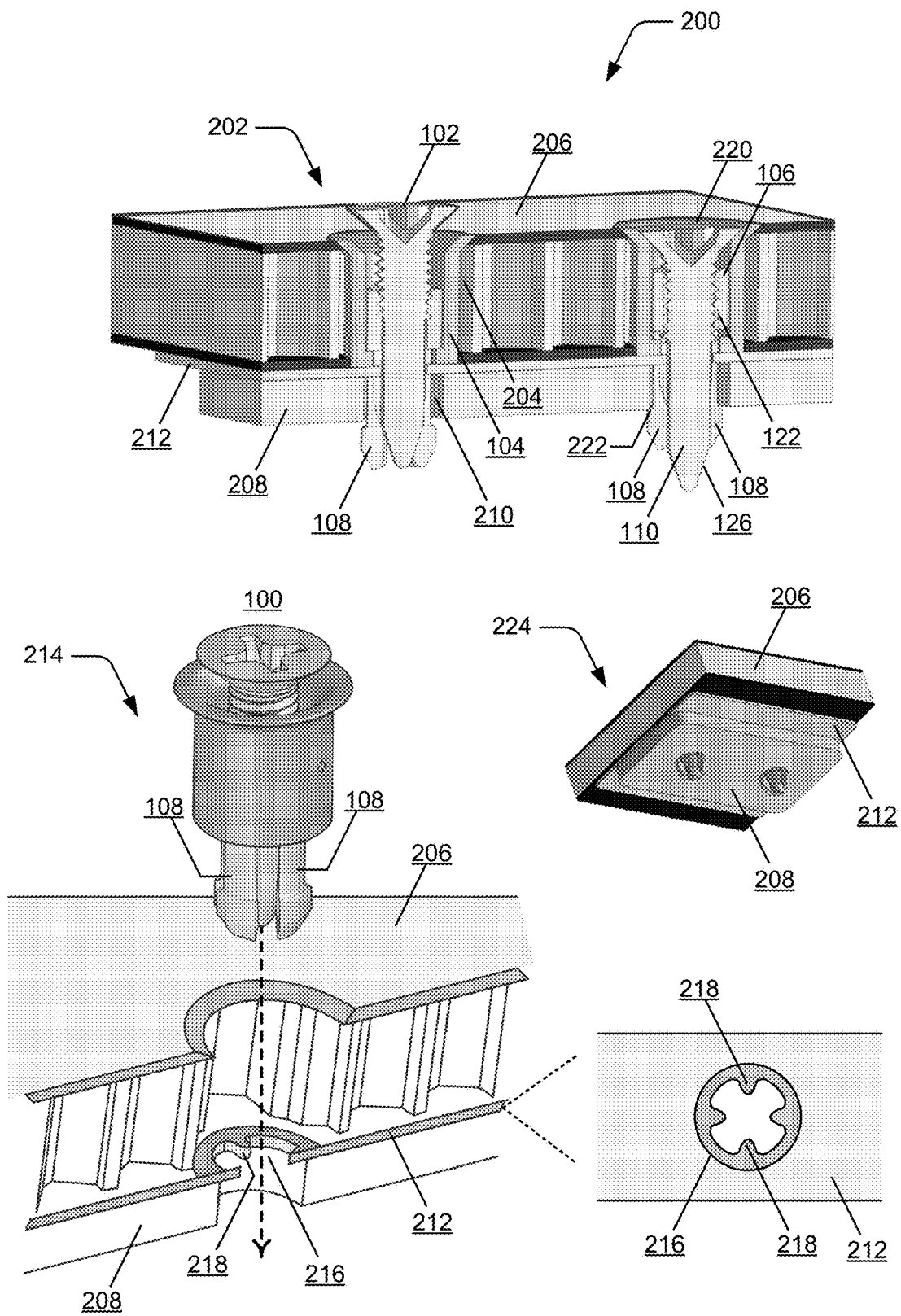
FIG. 2 illustrates detail views of the pressure lock retention fastener in accordance with aspects and features of the described fastener assembly.

FIG. 2 illustrates additional features 200 of the example pressure lock retention fastener 100 that can be utilized to fasten together two panel structures in accordance with the techniques for using the fastener. As shown at 202, the fastener assembly can be inserted into the pre-drilled or pre-stamped fastener hole 204 in a first panel 206, with the insert 104 being of a diameter for insertion into the fastener hole 204 through the first panel. The second panel 208 also has a pre-drilled or pre-stamped hole 210 that aligns with the fastener hole 204 in the first panel 206, and the aligned hole 210 in the second panel 208 accommodates the expandable flanges 108 of the fastener assembly. The insert 104 is sized and designed for insertion into the fastener hole 204 through the first panel 206, and the extended edge 116 of the insert 104 sets flush with the top of the first panel or recessed into the fastener hole.

In implementations, a plate 212 may be utilized in between the first panel 206 and the second panel 208 that are fastened together. As shown in the detail at 214, the plate 212 includes slotted holes 216 that align with the pre-drilled or pre-stamped holes in the first panel 206 and the second panel 208. The slotted holes 216 in the plate 212 are designed with anti-rotation tabs 218 that engage the slots between the expandable flanges 108 of the threaded collet 106 as the fastener assembly is inserted through the pre-drilled or pre-stamped panel holes. The anti-rotation tabs 218 of the slotted holes 216 in the plate 212 engage the respective slots between the expandable flanges 108 effective to prevent the fastener assembly from spinning in the fastener hole of the first panel and in the aligned hole in the second panel, such as when the screw 102 is torqued down. Although generally shown and described as a plate in FIG. 2, the anti-rotation feature may be implemented as a strip (e.g., metal, or other composite) with multiple slotted holes aligned down the strip, or as individual stamped washers or other inserts configured to counter the rotation effect when the screw 102 is torqued down.

As described above and shown in this example, the first panel 206 may be a floor panel, or any other type of panel or structure. Notably, the floor panels of most modern aircraft are a honeycomb and aluminum composite, as shown in the example illustration. The second panel 208 is a base piece, such as a floor structure or rail, to which the top floor panel is attached. The plate 212 may be implemented as a bonded aluminum, stamped sheet metal plate under the honeycomb panel 206. In general terms, the pressure lock retention fastener 100 is designed to attach or fasten a panel to a structure, a support structure, another panel, a rail, and the like. The pressure lock retention fastener 100 can be installed vertical, horizontal, upside down, etc. It is a very versatile fastener assembly, and can likely be used in every industry, including automotive, aerospace, construction, manufacturing, etc.

In an assembly sequence, a screwdriver tip can be used to rotate the screw 102, as may be automated by use of a robot, and the top of the screw 102 will set down approximately flush with the top of the insert 104, or recessed, as shown at 220. The screw 102 has the beveled surface 126 of the smooth pin end 110 of the screw, and the beveled surface 126 slides against the inner surfaces 128 of the expandable flanges 108. This exerts the outward force that pushes the expandable flanges 108 outward as the screw rotation drives the screw 102 down, engaging the internal threads 122 of the threaded collet 106 in the insert 104. As the screw 102 is driven down, this screw rotation also draws the threaded collet 106 vertically up within the inside of the insert 104, and the ridge locks 138 of the expandable flanges 108 are seated up against the exterior surface of the second panel 208, as shown at 222, effective to fasten the first and second panels together.

Even though the top of the screw 102 is recessed into or flush with the insert 104 at the top of the first panel 206, it continues to pull the expandable flanges 108 up from the bottom and tightens the ridge locks 138 against the structure of the lower, second panel 208. The ridge locks 138 of the expandable flanges 108 each contact the exterior surface of the second panel 208 around the aligned hole 210 with the threaded collet 106 torqued up within the insert 104, and the fastener assembly will remain held in the fastened position. This is also shown in the detail at 224 from a perspective view under the panels 206, 208 that are fastened together with the plate 212 installed between them. The ridge lock 138 of the expandable flanges 108 is a type of pressure lock on the underside exterior surface of the second panel 208 that is activated by the applied torque to the screw 102 as the screw engages the internal threads 122 of the threaded collet 106 in the insert 104.

Figure 3:
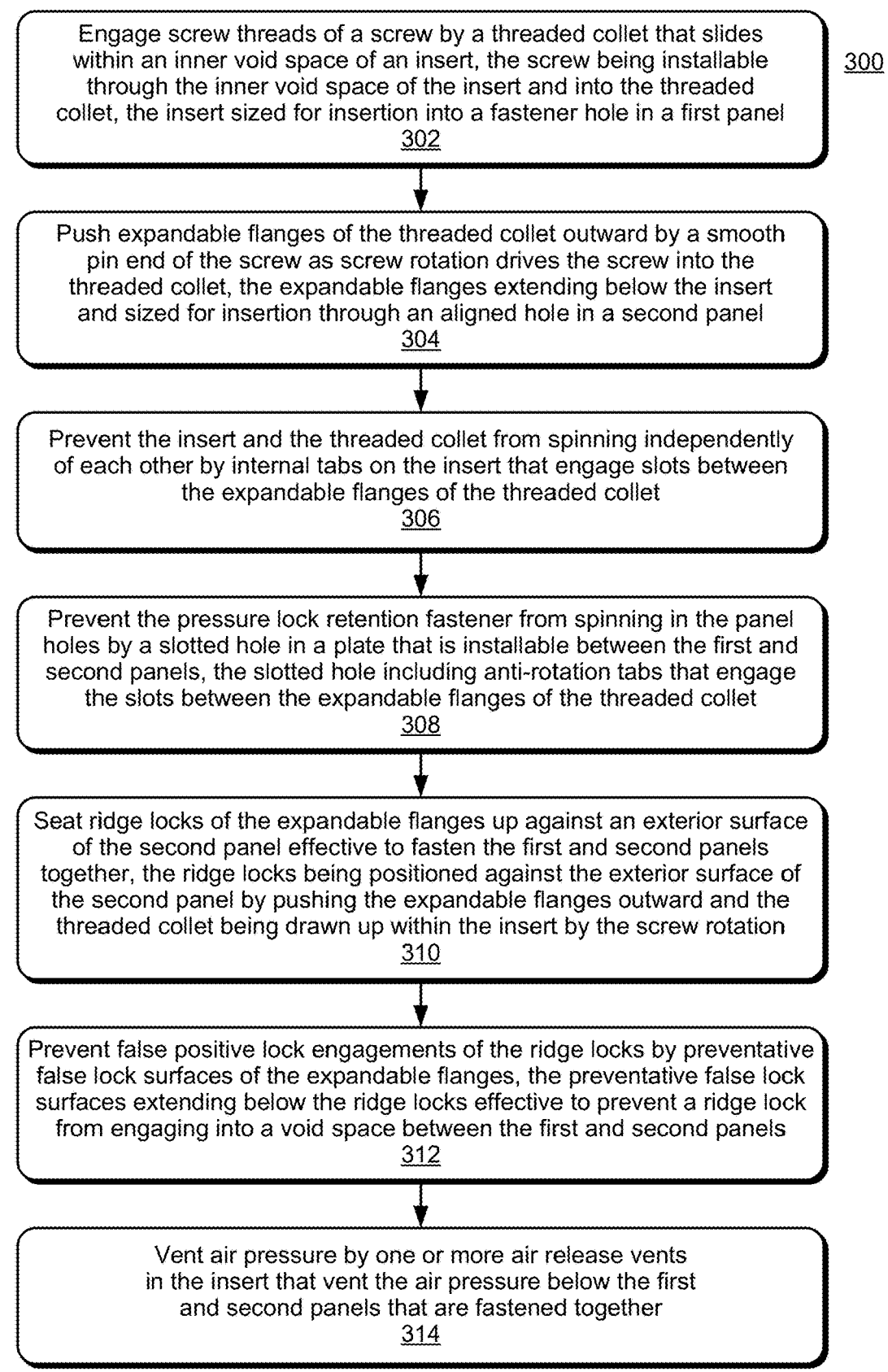
FIG. 3 illustrates an example method of a pressure lock retention fastener in accordance with one or more implementations.

FIG. 3 illustrates an example method 300 for a pressure lock retention fastener as shown and described with reference to FIGS. 1 and 2. The order in which the method is described is not intended to be construed as a limitation, and any number or combination of the method operations can be combined in any order to implement a method, or an alternate method.

At 302, screw threads of a screw are engaged by a threaded collet that slides within an inner void space of an insert, the screw being installable through the inner void space of the insert and into the threaded collet, the insert sized for insertion into a fastener hole in a first panel. For example, the screw threads of the threaded end 120 of the screw 102 are engaged by the threaded collet 106 that slides within the inner void space of the insert 104. The screw 102 is installable through the inner void space of the insert 104 and into the threaded collet, and the insert 104 is sized for insertion into a fastener hole 204 in the first panel 206. Notably, the screw threads and the threaded collet 106 are concentric, and the screw threads engage the internal threads 122 of the threaded collet without binding the screw threads in the threaded collet.

At 304, expandable flanges of the threaded collet are pushed outward by a smooth pin end of the screw as screw rotation drives the screw into the threaded collet, the expandable flanges extending below the insert and sized for insertion through an aligned hole in a second panel. For example, the expandable flanges 108 of the threaded collet 106 are pushed outward by the smooth pin end 110 of the screw 102 as screw rotation drives the screw into the threaded collet. The expandable flanges 108 extend below the insert 104 and are sized for insertion through the aligned hole 210 in the second panel 208.

At 306, the insert and the threaded collet are prevented from spinning independently of each other by internal tabs on the insert that engage slots between the expandable flanges of the threaded collet. For example, the insert 104 and the threaded collet 106 are prevented from spinning independently of each other by the internal tabs 136 on the insert 104 that engage the slots between the expandable flanges 108 of the threaded collet.

At 308, the pressure lock retention fastener is prevented from spinning in the panel holes by a slotted hole in a plate that is installable between the first and second panels, the slotted hole including anti-rotation tabs that engage the slots between the expandable flanges of the threaded collet. For example, the pressure lock retention fastener 100 is prevented from spinning in the panel holes (e.g., the fastener hole 204 in the first panel 206 and the aligned hole 210 in the second panel 208) by the slotted hole 216 in the plate 212 that is installable between the first and second panels. The slotted hole includes the anti-rotation tabs 218 that engage the slots between the expandable flanges 108 of the threaded collet 106.

At 310, ridge locks of the expandable flanges are seated up against an exterior surface of the second panel effective to fasten the first and second panels together, the ridge locks being positioned against the exterior surface of the second panel by pushing the expandable flanges outward and the threaded collet being drawn up within the insert by the screw rotation. For example, the ridge locks 138 of the expandable flanges 108 are seated up against the exterior surface of the second panel 208 effective to fasten the first and second panels together. The ridge locks 138 are positioned against the exterior surface of the second panel by the force pushing the expandable flanges 108 outward and the threaded collet 106 being drawn up within the insert 104 by the screw rotation.

At 312, false positive lock engagements of the ridge locks are prevented by preventative false lock surfaces of the expandable flanges, the preventative false lock surfaces extending below the ridge locks effective to prevent a ridge lock from engaging into a void space between the first and second panels. For example, false positive lock engagements of the ridge locks 138 are prevented by the preventative false lock surfaces 140 of the expandable flanges 108, where the preventative false lock surfaces 140 extend below the ridge locks 138 effective to prevent a ridge lock from engaging into a void space between the first and second panels.

At 314, air pressure is vented by one or more air release vents in the insert that vent the air pressure below the first and second panels that are fastened together. For example, the insert 104 can include the air release vent 144 to vent air pressure, such as when air pressure builds up below the panels that are fastened together with the fasteners, and the air pressure can be vented to an open space above the panels. Alternatively or in addition, the insert 104 may include one or more of the air release vents 146 notched in the top of the insert to vent the air pressure.

Figure 4:
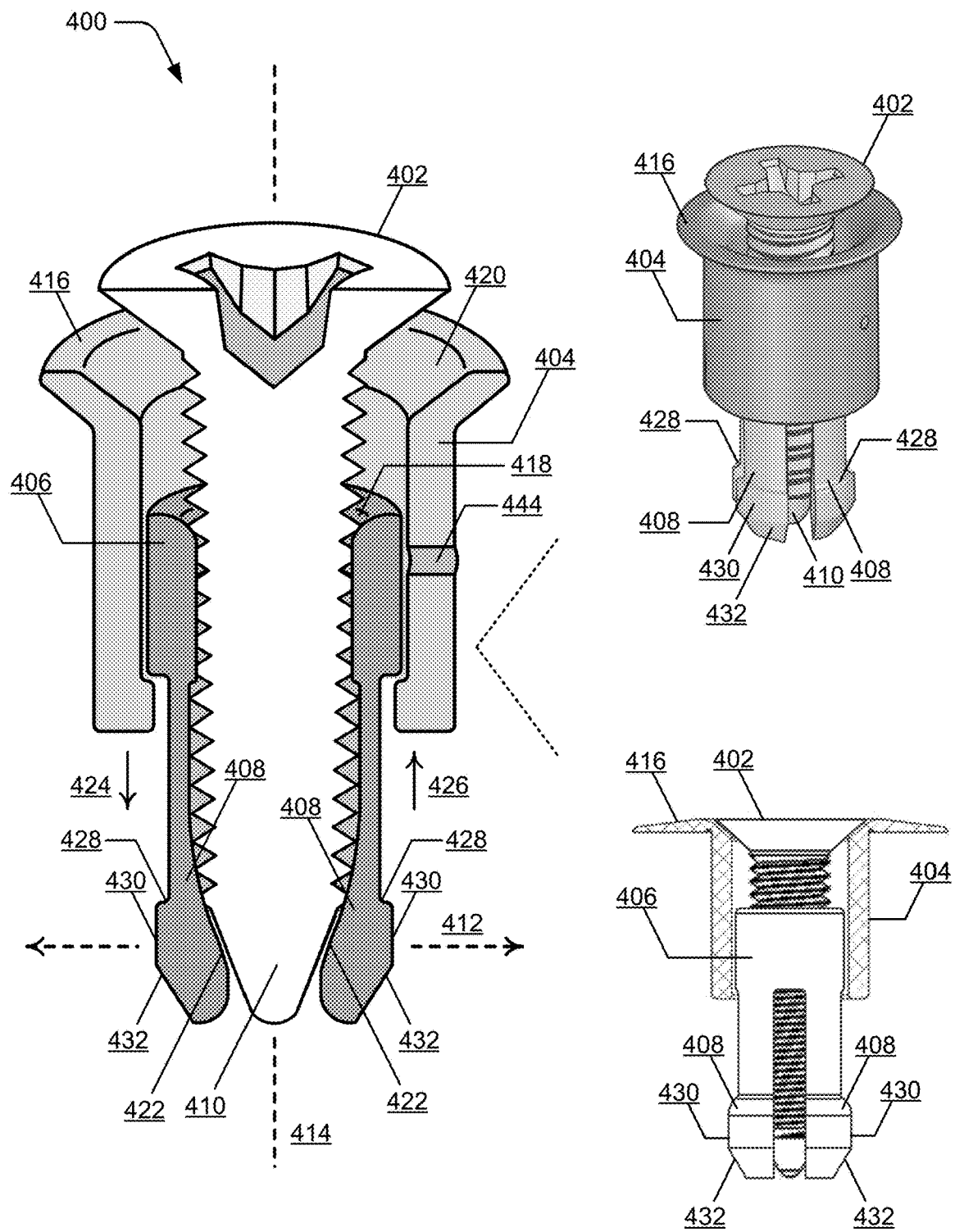
FIG. 4 illustrates another example assembly of a pressure lock retention fastener in accordance with aspects and features of the described fastener assembly.

FIG. 4 illustrates another example assembly of a pressure lock retention fastener 400 in accordance with aspects and features of the fastener assembly. The pressure lock retention fastener 400 is similar (but not identical) to the pressure lock retention fastener 100 as shown and described with reference to FIGS. 1-3, and has various, different design features. The pressure lock retention fastener 400 can be pre-assembled and shipped for use as a ready-to-use assembly that includes a screw 402 and an insert 404, as well as a threaded collet 406 with expandable flanges 408 that are designed to expand outward as the end 410 of the screw is driven down, forcing the expandable flanges 408 to expand outward. Generally, each of the expandable flanges 408 expands outward (relative to each other) along a horizontal plane 412 that is perpendicular to a vertical plane 414 through a center of the fastener assembly. An internal distance between the expandable flanges 408 increases as the flanges are expanded outward as the screw is rotated down into the threaded collet.

As described in detail below, the insert 404 is formed with an extended edge 416 that is designed to seat flush or recessed into a fastener hole in a first panel that is attached to a second panel, and the insert 404 is sized for insertion into the fastener hole in the first panel. Generally, the insert 404 a has an inner void space down through the insert, and the threaded collet 406 has an outer diameter sized to slide into the inner void space of the insert 404. The threaded collet 406 includes the expandable flanges 408 that extend below the insert 404, and the expandable flanges 408 are sized for insertion into an aligned hole in the second panel. In implementations, the first panel includes pre-drilled or pre-stamped fastener holes and the second panel also includes pre-drilled or pre-stamped holes that are aligned with the fastener holes in the first panel.

The screw 402 is installable through the inner void space of the insert 404 and into the threaded collet 406. The screw 402 has screw threads that engage (e.g., screw into) the internal threads 418 of the threaded collet 406. The screw 402 is designed with the end 410 that is beveled and slides against the expandable flanges 408, exerting a force that pushes the expandable flanges 408 outward as screw rotation drives the screw down into the threaded collet 406, engaging the internal threads 418 of the threaded collet 406.

In this example, the expandable flanges 408, which are also referred to in industry as "tangs" of the threaded collet 406, are spaced at multiple positions extending from the threaded collet, and are designed to expand outward in a deployed state of the fastener assembly. Although the threaded collet 406 is generally shown and described herein as having four expandable flanges 408, the fastener assembly may be implemented with two, three, or more expandable flanges to accommodate the various requirements for different fastening applications. In this illustrated example, the fastener assembly is shown in a non-deployed, ready for installation state, with the screw 402 being held in place partially screwed into the internal threads 418 of the threaded collet 406, and the screw-collet assembly is held in place in the insert 404. The insert 404 and the threaded collet 406 with the screw 102 are ready for installation in the ready-to-use assembly state of the fastener assembly, as shown in FIG. 4.

In implementations of the fastener assembly, the screw 402 is installable through a top end 420 of the insert 404, through the inner void space of the insert and into the threaded collet 406. As noted above, the screw 402 is positioned to slide against the inner surfaces 422 of the expandable flanges 408. This exerts an outward force that pushes the expandable flanges 408 outward as the screw rotation drives the screw 402 down into the threaded collet 406, engaging the internal threads 418 of the threaded collet in the insert 404. As the screw 402 is driven down (in reference direction 424), this also draws the threaded collet 406 up (in reference direction 426) within the insert 404.

As shown and described above with reference to FIG. 2, the fastener assembly of the pressure lock retention fastener 400 is installable into pre-drilled holes through first and second panels to be fastened together. The expandable flanges 408 of the threaded collet 406 can be extended through the pre-drilled, fastener hole 204 in the first panel 206 and on through an aligned, corresponding pre-drilled hole 210 in the second panel 208. Optionally, and as further shown and described with reference to FIG. 2, the plate 212 may be utilized in between the first and second panels that are to be fastened together. Generally, the plate 212 includes the slotted holes 216 that align with the pre-drilled holes in the first and second panels. The slotted holes 216 in the plate are designed with the anti-rotation tabs 218 that engage and slide into the slots between the expandable flanges 408 of the threaded collet 406 as the fastener assembly is inserted through the pre-drilled holes in the panels and through a slotted hole 216 in the plate 212 that is installed between the two panels.

The anti-rotation tabs 218 of the slotted holes 216 in the plate 212 engage the respective slots that exist between the expandable flanges 408 effective to prevent the fastener assembly from spinning in the fastener hole 204 of the first panel 206 and in the aligned hole 210 in the second panel 208, such as when the screw 402 is torqued down. Although generally shown and described as the plate in FIG. 2, the anti-rotation feature may be implemented as a strip (e.g., metal, or other composite) with multiple slotted holes aligned down the strip, or as individual stamped washers or other inserts configured to counter the rotation effect when the screw 402 is torqued down.

As the screw rotation then drives the screw 402 down (in reference direction 424), and the threaded collet 406 is drawn up (in reference direction 426) within the insert 404, ridge locks 428 of the expandable flanges 408 are seated up against the exterior surface of the second panel 208 effective to fasten the first and second panels together. Optionally, as noted above, the plate 212 with the slotted holes 216 designed for anti-rotation of the fastener assembly may also be fastened between the first and second panels. The ridge locks 428 of the expandable flanges 408 are a type of pressure lock on the exterior surface of the second panel 208 that is activated by the applied torque to the screw 402 as the screw engages the internal threads 418 of the threaded collet 406 in the insert 404. The screw 402 is rotatable to torque the ridge locks 428 of the expandable flanges 408 up to seat against the exterior surface of the second panel 208 as the threaded collet 406 is drawn up within the insert 404 by the screw rotation.

Notably, the threaded collet 406 is not an expanding nut, but rather, is straight and concentric with the internal threads 418 that smoothly engage the screw threads of the screw 402. The screw threads and the internal threads 418 of the threaded collet 406 are concentric, and the screw threads can engage the internal threads of the threaded collet 406 without binding the screw threads in the threaded collet. Generally, the parallel design of the threaded collet 406 and the screw 402 of the fastener assembly reduces or eliminates tension between the threads of both so that they don't bind. As can occur with conventional fastener systems, the screw threads may bind and peel in an implementation that uses an expanding nut with binding pressure, which can lead to degradation of the thread screws and/or degradation of the collet threads in the form of metal shavings that may then interfere with and/or damage surrounding components.

A particular feature of the pressure lock retention fastener 400 is the configuration shape of the lower ends (e.g., that insert into the pre-drilled holes in the panels) of the expandable flanges 408 of the threaded collet 406. As noted above, the lower ends of the expandable flanges 408 have the inner surface 422 on which the beveled end 410 of the screw 402 slides against, exerting the outward force that pushes the expandable flanges 408 outward as screw rotation drives the screw 402 down into the threaded collet 406. The lower ends of the expandable flanges 408 also include the ridge locks 428 that seat up against the exterior surface of the second panel effective to fasten the first and second panels together. The outer surface of the lower end of each expandable flange 408 also includes a preventative false lock surface 430, shown as the straight portion below the ridge lock 428, that leads into a lower, beveled portion 432 of the expandable flange. The lower, beveled portion 432 of the expandable flanges 408 facilitates ease of installation of the fastener assembly into and through the pre-drilled holes in the panels that are to be fastened together with the fastener assemblies.

In this implementation, the preventative false lock surface 430 of the lower ends of the expandable flanges 408 is flat on a parallel plane relative to the center of the fastener assembly, and is curved relative to the circumference shape of the threaded collet 406. The preventative false lock surfaces 430 of the lower ends of the expandable flanges 408 (e.g., the straight, flat portion below the ridge lock 428 and above the lower, beveled portion 432) is designed to prevent the ridge lock 428 from engaging into a void space between the first and second panels. This prevents or eliminates false positive lock engagements, notably preventing an indication that a fastener is installed and seated correctly when-in-fact it has falsely engaged between the two panels, rather than being seated up against the outer, lower exterior of the second panel. As can occur with conventional fastener systems that have a sloping flange without some type of a guide or preventative feature to prevent false positive lock engagements, the lock mechanism of a conventional fastener system may catch in the detent or void space between the first and second panels that are being fastened together, and the misalignment results in the panels not being fastened together.

As also shown in this example assembly of the pressure lock retention fastener 400, the insert 404 may be designed with an air release vent 434 to vent air pressure, such as when air pressure builds up below the panels that are fastened together with the fasteners, and the air pressure can be vented to an open space above the panels. The pressure lock retention fastener 400 has the aspects of retention via pressure for deployment of the fastener assembly, which can be deployed as a fastener assembly unit in a robotic or automated process for a true top-down fastener solution. In implementations, multiple pressure lock retention fasteners can be used to build floor panels, such as in an aircraft, with a robot that has an automated belt feed system, where the robot can grasp a ready-to-use assembly of a pressure lock retention fastener 400 in a tool. The robot can grasp the insert 404 of the assembly, use an automatic gluing mechanism to spin the whole fastener around once and apply glue to it, such as on the external, outer diameter of the insert. The robot can then insert the fastener assembly into a prepared, pre-drilled hole in a floor panel with a structural beam underneath the floor panel, and optionally through the metal plate or strips with the slotted anti-rotation holes secured in between the floor panel and the structural beam or track. The floor panel and the structural beam or track are pre-drilled or pre-stamped with holes that are aligned and ready to have an assembly of the pressure lock retention fastener 400 installed, and the fastener assembly can be inserted into the pre-drilled holes and seated with the prescribed amount of glue applied to the insert 404 of the fastener. Notably, the glue feature is optional, but can be used to provide extra strength and customizability for sheer loads and various customer requirements in different fastening applications.

Figure 5:
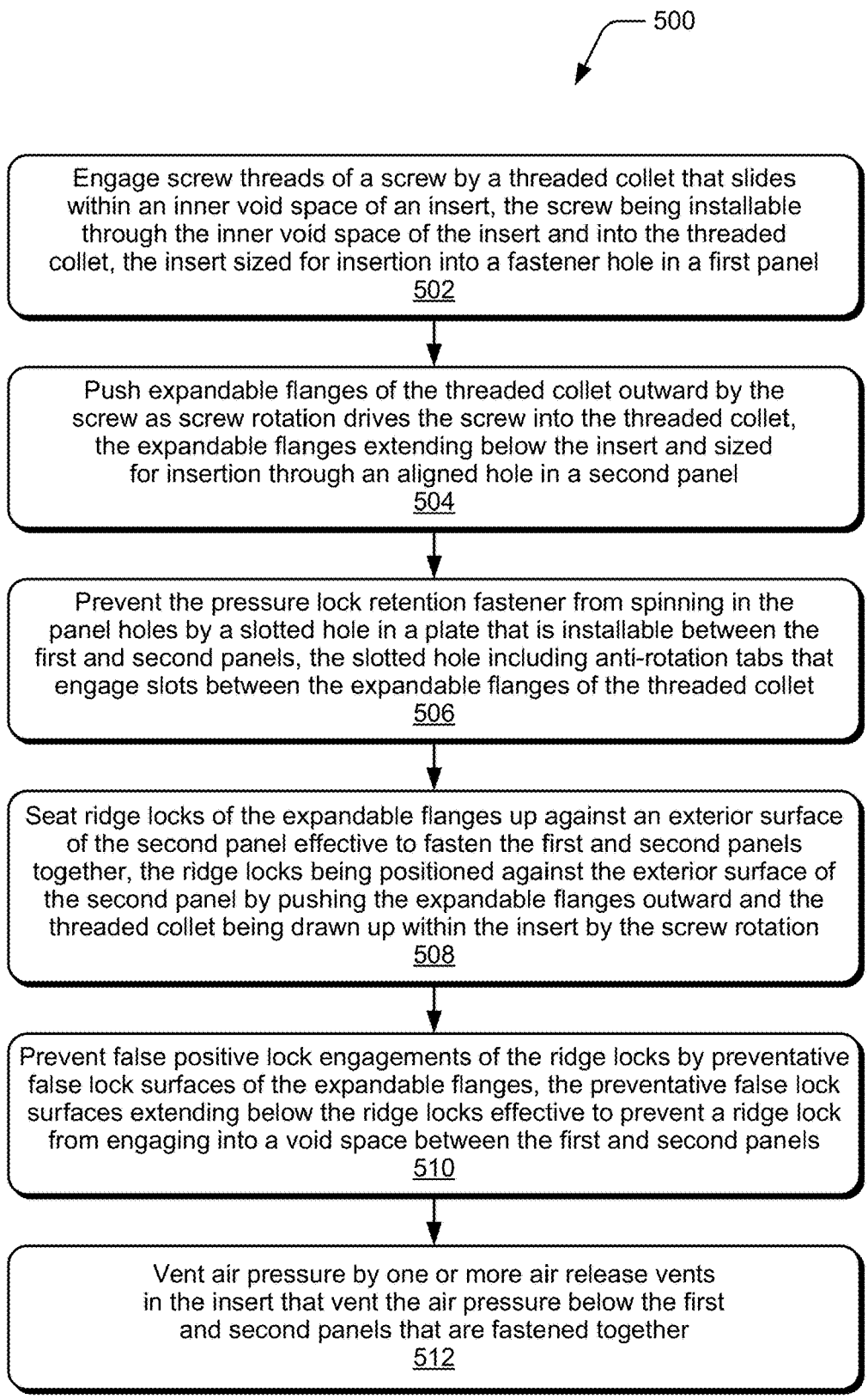
FIG. 5 illustrates an example method of a pressure lock retention fastener in accordance with one or more implementations.

FIG. 5 illustrates an example method 500 for a pressure lock retention fastener as shown and described with reference to FIG. 4 and installation with reference to FIG. 2. The order in which the method is described is not intended to be construed as a limitation, and any number or combination of the method operations can be combined in any order to implement a method, or an alternate method.

At 502, screw threads of a screw are engaged by a threaded collet that slides within an inner void space of an insert, the screw being installable through the inner void space of the insert and into the threaded collet, the insert sized for insertion into a fastener hole in a first panel. For example, the screw threads of the screw 402 are engaged by the threaded collet 406 that slides within the inner void space of the insert 404. The screw 402 is installable through the inner void space of the insert 404 and into the threaded collet, and the insert 404 is sized for insertion into a fastener hole 204 in the first panel 206. Notably, the screw threads and the threaded collet 406 are concentric, and the screw threads engage the internal threads 418 of the threaded collet without binding the screw threads in the threaded collet.

At 504, expandable flanges of the threaded collet are pushed outward by the screw as screw rotation drives the screw into the threaded collet, the expandable flanges extending below the insert and sized for insertion through an aligned hole in a second panel. For example, the expandable flanges 408 of the threaded collet 406 are pushed outward by the screw 402 as screw rotation drives the screw into the threaded collet. The expandable flanges 408 extend below the insert 404 and are sized for insertion through the aligned hole 210 in the second panel 208.

At 506, the pressure lock retention fastener is prevented from spinning in the panel holes by a slotted hole in a plate that is installable between the first and second panels, the slotted hole including anti-rotation tabs that engage slots between the expandable flanges of the threaded collet. For example, the pressure lock retention fastener 400 is prevented from spinning in the panel holes (e.g., the fastener hole 204 in the first panel 206 and the aligned hole 210 in the second panel 208) by the slotted hole 216 in the plate 212 that is installable between the first and second panels. The slotted hole includes the anti-rotation tabs 218 that engage the slots between the expandable flanges 408 of the threaded collet 406.

At 508, ridge locks of the expandable flanges are seated up against an exterior surface of the second panel effective to fasten the first and second panels together, the ridge locks being positioned against the exterior surface of the second panel by pushing the expandable flanges outward and the threaded collet being drawn up within the insert by the screw rotation. For example, the ridge locks 428 of the expandable flanges 408 are seated up against the exterior surface of the second panel 208 effective to fasten the first and second panels together. The ridge locks 428 are positioned against the exterior surface of the second panel by the force pushing the expandable flanges 408 outward and the threaded collet 406 being drawn up within the insert 404 by the screw rotation.

At 510, false positive lock engagements of the ridge locks are prevented by preventative false lock surfaces of the expandable flanges, the preventative false lock surfaces extending below the ridge locks effective to prevent a ridge lock from engaging into a void space between the first and second panels. For example, false positive lock engagements of the ridge locks 428 are prevented by the preventative false lock surfaces 430 of the expandable flanges 408, where the preventative false lock surfaces 430 extend below the ridge locks 428 effective to prevent a ridge lock from engaging into a void space between the first and second panels.

At 512, air pressure is vented by one or more air release vents in the insert that vent the air pressure below the first and second panels that are fastened together. For example, the insert 404 can include the air release vent 434 to vent air pressure, such as when air pressure builds up below the panels that are fastened together with the fasteners, and the air pressure can be vented to an open space above the panels.

Figure 6:
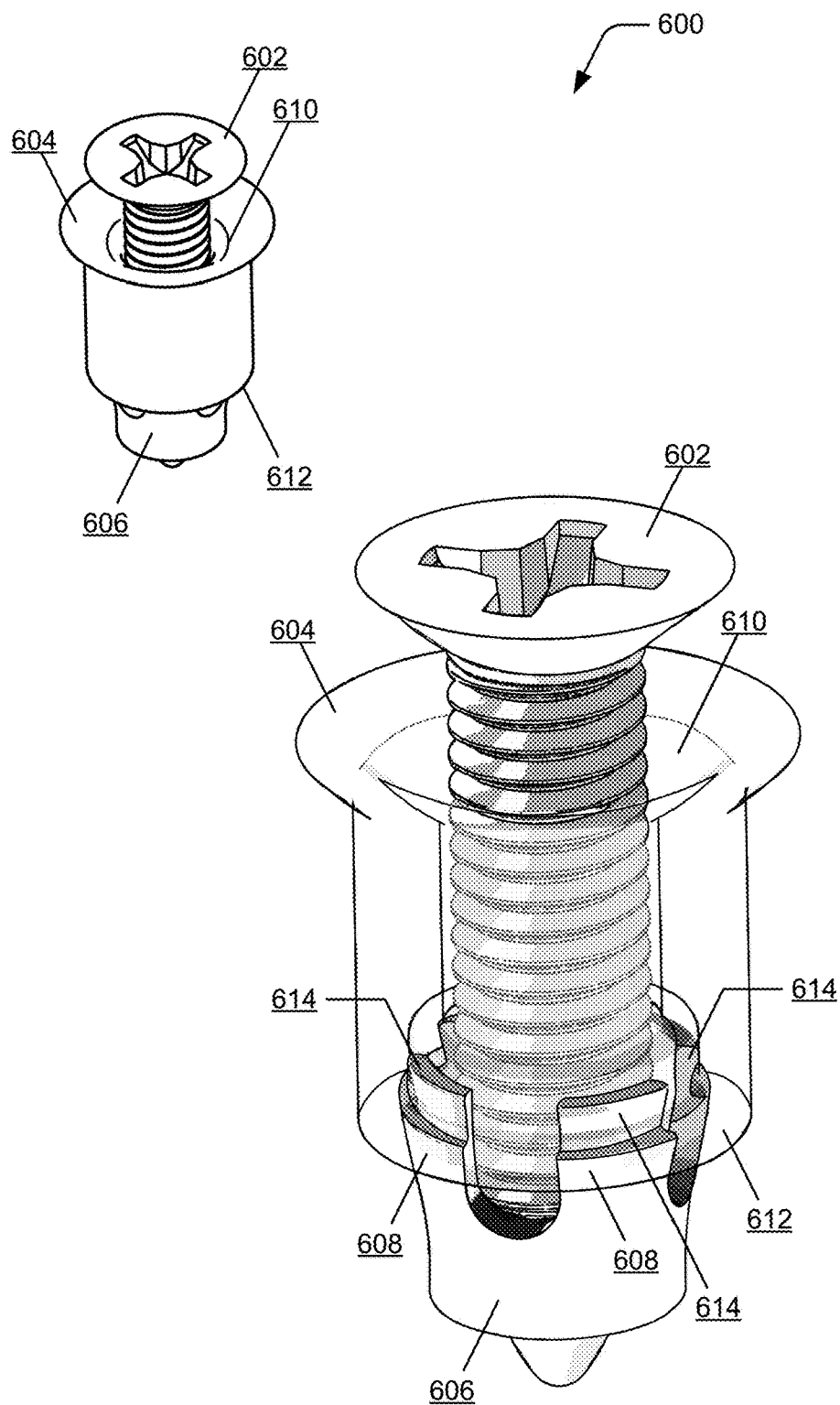
FIG. 6 illustrates another example assembly of a pressure lock retention fastener in accordance with aspects and features of the described fastener assembly.

FIG. 6 illustrates another example assembly of a pressure lock retention fastener 600 in accordance with aspects and features of the fastener assembly. The pressure lock retention fastener 600 can be pre-assembled and shipped for use as a ready-to-use assembly that includes a screw 602 and a receptacle 604, as well as a pressure lock 606 (also referred to herein as the "pressure lock nut") with flanges 608 (also referred to herein as the "pedals") that are pressure loaded (e.g., spring loaded) and designed to be retained inside of the receptacle in the overall assembly. In this example, the flanges 608 are spaced at four locations (or three, five, six, etc. for any application) around the pressure lock 606, and are designed to expand in the non-deployed assembly state of the fastener and held in place by being pressure loaded. The pressure lock 606 and the receptacle 604 are seated together and ready for installation in the ready-to-use assembly state of the fastener assembly, as shown in FIG. 6.

In implementations, the assembly of the pressure lock retention fastener 600 includes the receptacle 604, and the screw 602 can be inserted through a first end 610 of the receptacle 604. The fastener assembly also includes the pressure lock 606, which is threaded and designed to engage the screw at a second end 612 of the receptacle 604. The pressure lock 606 has the flanges 608 that each exert a pressure against an interior surface of the receptacle 604 effective to hold the pressure lock 606 and the screw 602 in the receptacle. As shown and described with reference to FIG. 8, the fastener assembly of the pressure lock retention fastener 600 is installable into pre-drilled or pre-stamped holes through first and second panels to be fastened together. The pressure lock 606 can be unseated from the interior surface of the receptacle 604 effective to extend a portion of the pressure lock through the pre-drilled hole of the second panel. A torque can then be applied to seat the pressure lock 606 up against the second panel effective to fasten the first and second panels together.

In aspects of the pressure lock retention fastener as a fastener assembly, the receptacle 604 is not threaded, allowing insertion of the screw 602 through the first end 610 the receptacle 604 to the second end 612 of the receptacle, engaging the pressure lock 606. The pressure lock 606 then holds the screw 602 in the receptacle 604 such that the pressure lock retention fastener is a ready-to-use assembly. The pressure lock 606 has the flanges 608 that are indented, and appear as an inverted "L-shape", with indented extensions 614. These indented extensions 614 (also referred to herein as the "fingers" or "finger extensions") have a shape that provides the pressure lock will remain in place in the receptacle in the non-deployed assembly state, as shown in FIG. 6.

In implementations, multiple pressure lock retention fasteners 600 can be used to build floor panels, such as in an aircraft, with a robot that has an automated belt feed system, where the robot can grasp a ready-to-use assembly of a pressure lock retention fastener in a tool. The robot can grasp the receptacle 604 of the assembly, use an automatic gluing mechanism to spin the whole fastener around once and apply glue to it, such as on the external, outer diameter of the receptacle. The robot can then place the fastener assembly into a prepared, pre-drilled or pre-stamped hole in a floor panel with a structural beam underneath the floor panel. The floor panel and the structural beam are pre-drilled or pre-stamped with holes that are ready to have an assembly of the pressure lock retention fastener 600 installed, and the fastener assembly can be placed in the pre-drilled holes and seated with the prescribed amount of glue applied to the receptacle 604 of the fastener.

As described in more detail below, and with reference to the feature of pressure in deployment, the fastener assembly is delivered for use with the pressure lock 606 held in position in the bottom of the receptacle 604, which also secures the screw loosely in-place in the fastener assembly. These can be pre-assembled by an automated system that clips those two pieces together and inserts the screw. This is a pressure driven fastener assembly, where pressure drives the receptacle 604 down to a preset depth when installed, and then pressure on the screw 602 deploys the pressure lock 606 from the detent position in the receptacle 604 into an actuation position. Then torque drives it to the final secured fastening position. Generally, use of the fastener assembly is a three-step engagement type process applying pressure and torque to pre-assemble the pressure lock retention fastener. Installation can be automated for robotic concurrent single side installation, with concurrent meaning installing the glue joints, fastener assembly, and final installation all together, as in glue, plus fastener, plus final torque. Notably, the glue feature is optional, but can be used to provide extra strength and customizability for sheer loads and various customer requirements.

Figure 7:
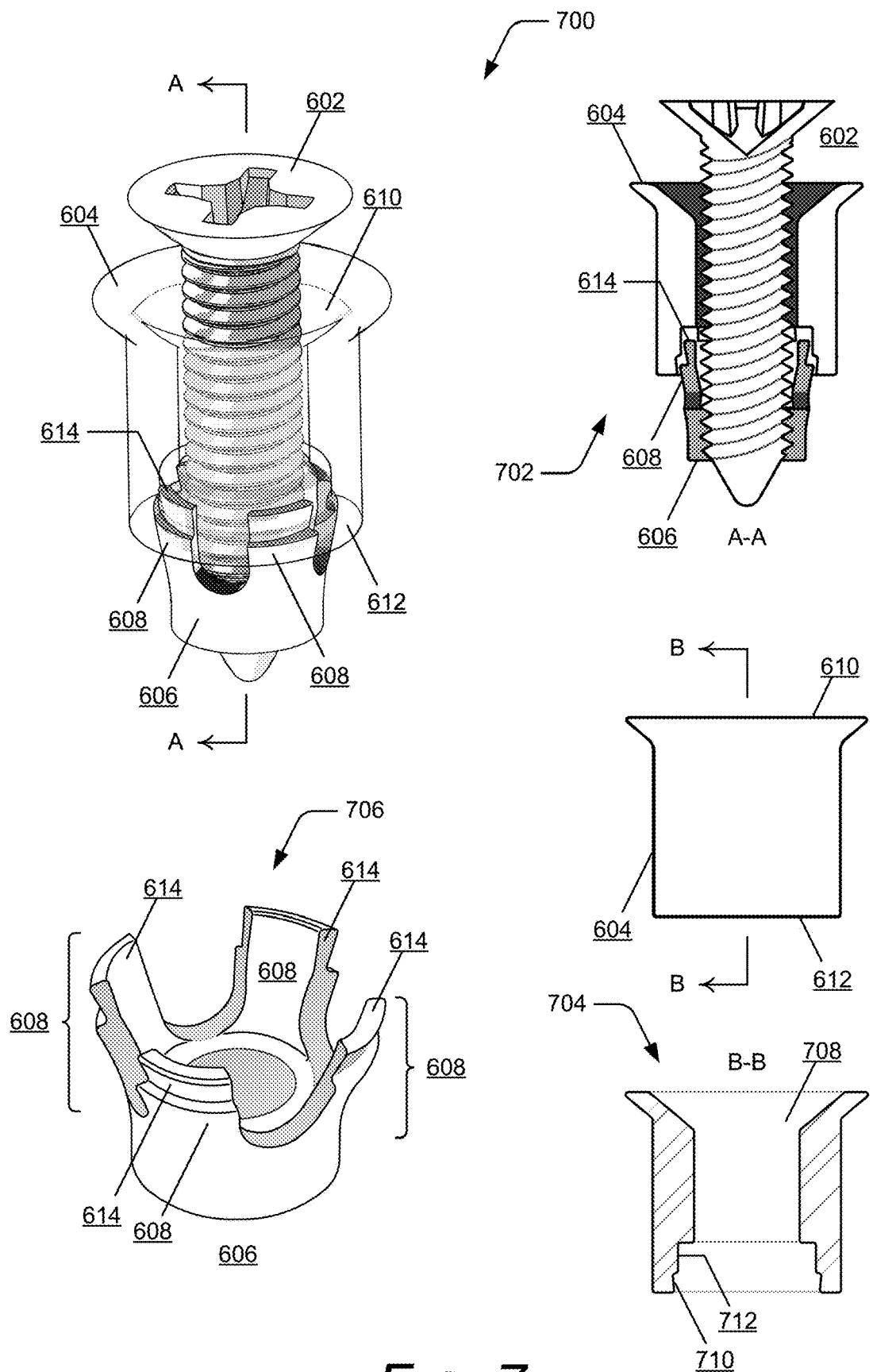
FIG. 7 illustrates detail views of the pressure lock retention fastener in accordance with aspects and features of the described fastener assembly.

FIG. 7 illustrates detail views 700 of the pressure lock retention fastener 600 in accordance with aspects and features of the fastener assembly. In the example detail views 700, a cross section A-A of the pressure lock retention fastener 600 is shown at 702, a cross section B-B of the receptacle 604 is shown at 704, and the pressure lock 606 is shown in more detail at 706. As noted above, the receptacle 604 is not threaded, and a void space 708 through the center of the receptacle 604 is shown in the cross section B-B of the receptacle at 704. As described above, the screw 602 is inserted into the receptacle 604 and the pressure lock 606 is threaded and designed to engage the screw. The pressure lock 606 then holds the screw 602 in the receptacle 604 such that the pressure lock retention fastener is a ready-to-use assembly.

The pressure lock 606 has the flanges 608 that each exert a pressure against an interior surface of the receptacle 604 effective to hold the pressure lock 606 and the screw 602 in the receptacle. In implementations, the flanges 608 of the pressure lock 606 engage a first detent 710 in the second end 612 of the receptacle 604 and exert a pressure against the interior surface of the first detent in the receptacle. Similarly, the flanges 608 of the pressure lock 606 include the indented extensions 614 that engage a second detent 712 in the second end 612 of the receptacle 604 and exert the pressure against the interior surface of the second detent in the receptacle. As illustrated, the flanges 608 of the pressure lock 606 are spring loaded, and designed with a bend out and heat treated to a certain state, such that the flanges 608 and the indented extensions 614 can be compressed inward and locked into the detents in the receptacle 604.

Generally, the indented extensions 614 of the flanges 608 on the pressure lock 606 expand and provide outward pressure to hold it in place and secure the pressure lock. Notably, the pressure lock 606 is not an expanding nut for deployment. Rather, the pressure lock 606 is a straight cut type of nut having the extended flanges 608 that are drawn into place and secured with a torque requirement. The pressure lock retention fastener 600 has the aspects of retention via pressure for deployment of the pressure lock, and the pressure lock retention fastener can be deployed as an assembly unit in a robotic or automated process as a fastener assembly for a true top-down fastener solution.

Figure 8:
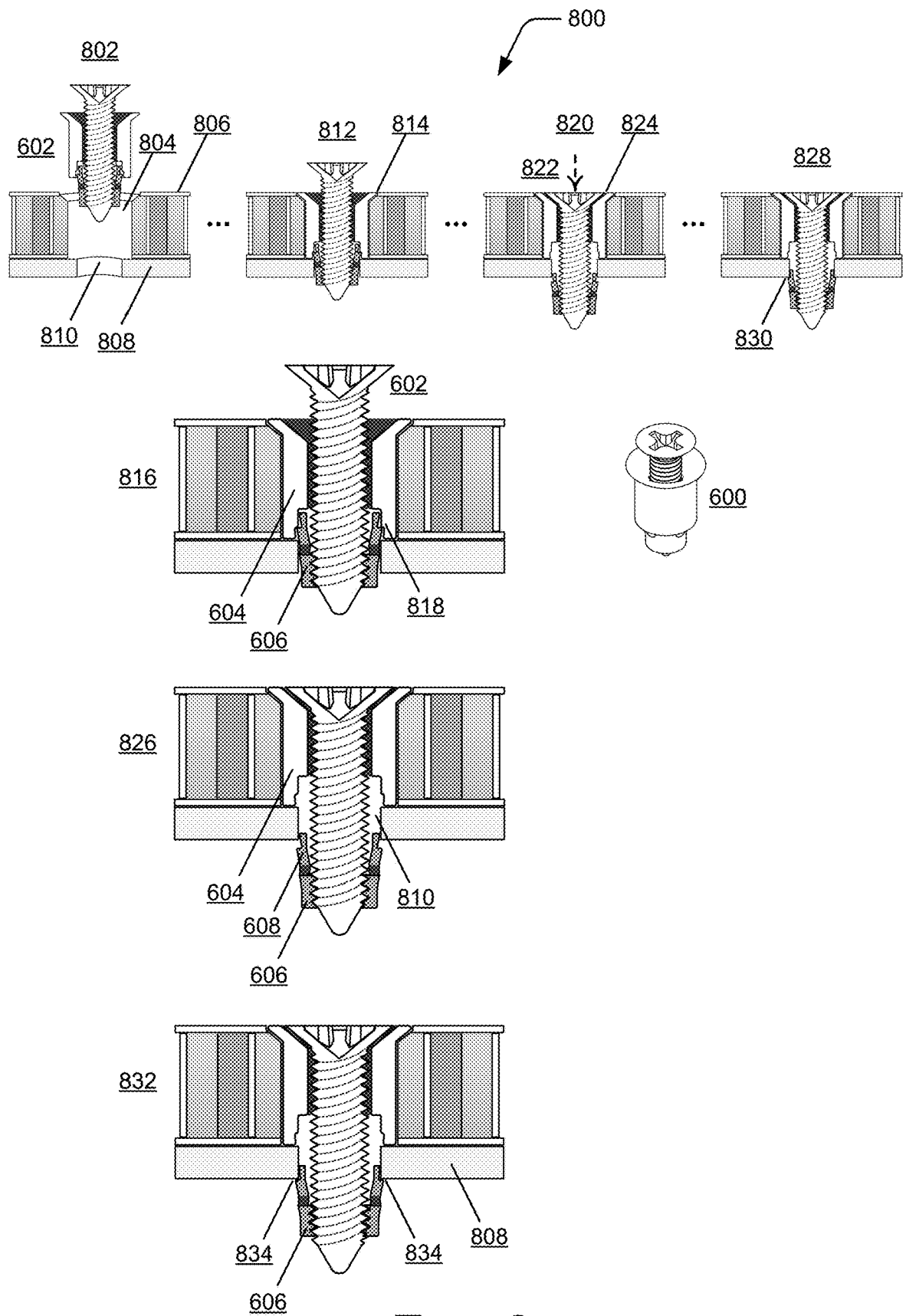
FIG. 8 illustrates a sequence of the example pressure lock retention fastener as would be utilized to fasten together two panel structures in accordance with techniques for using the fastener assembly.

FIG. 8 illustrates an assembly sequence 800 of the pressure lock retention fastener 600 as would be utilized to fasten together two panel structures in accordance with techniques for using the fastener assembly. As shown at 802, the pressure lock retention fastener 600 is placed in a pre-drilled or pre-stamped fastener hole 804 in a first panel 806, with the receptacle 604 being sized and of a diameter for insertion into the fastener hole 804 through the first panel. A second panel 808 also has a pre-drilled or pre-stamped hole 810 that aligns with the fastener hole 804 in the first panel 806, and the aligned hole 810 in the second panel 808 accommodates the pressure lock 606 of the fastener assembly.

As shown in this example, the first panel 806 may be a floor panel, or any other type of panel or structure. Notably, the floor panels of most modem aircraft are a honeycomb and aluminum composite, as shown in the example illustration. The second panel 808 is a base piece, such as a floor structure or rail, to which the top floor panel is attached. In general terms, the pressure lock retention fastener 600 is designed to fasten, attach, or adhere a panel to a structure, a support structure, a rail, another panel, and the like. The pressure lock retention fastener 600 can be installed vertical, horizontal, upside down, etc. It is a very versatile fastener assembly, and can likely be used in every industry, including automotive, aerospace, construction, manufacturing, etc.

As next shown at 812 in the assembly sequence to fasten together the first panel 806 and the second panel 808, the pressure lock retention fastener 600 can be dropped in the pre-drilled hole 804 and the pressure lock 606 is still in the non-deployed state with the screw sitting up off of the panel joint. The receptacle 604 is sized and has a diameter designed for insertion into the pre-drilled hole 804 through the first panel 806, and the receptacle 604 sets flush with the top of the first panel, as shown at 814. At this point, the pressure lock 606 of the fastener assembly is ready to be deployed while still being held in place in the receptacle 604, and the screw 602 is not yet seated in the receptacle, with the pressure lock being held threaded onto the bottom of the screw. This is also shown in the larger detail view 816. The pressure lock 606 is still held in place in the receptacle 604 by the flanges 608 and the indented extensions 614 of the flanges, as indicated at 818.

Figure 9:
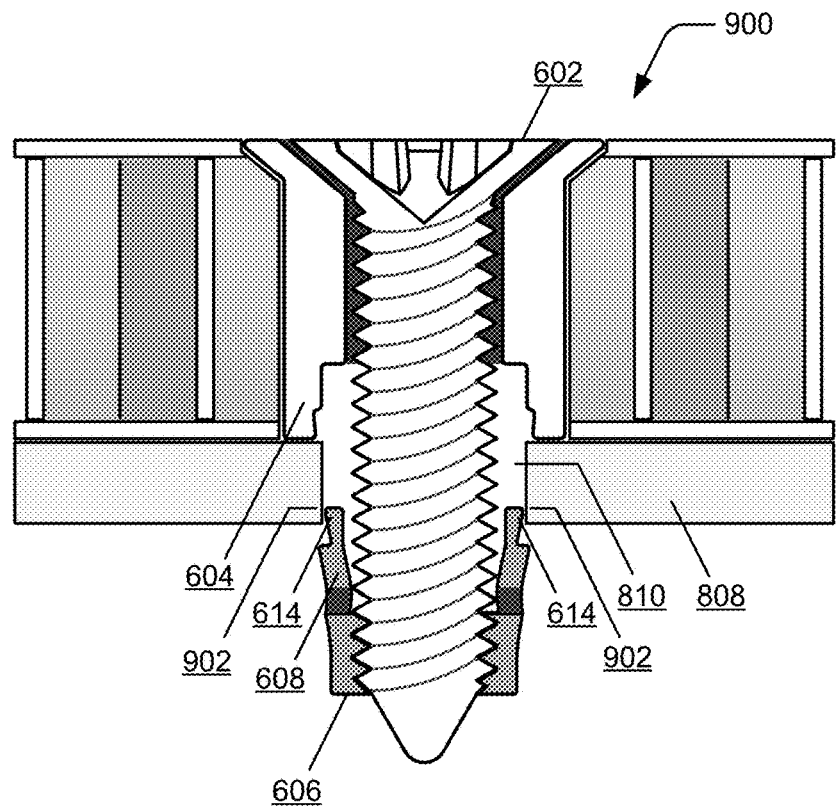
FIG. 9 further illustrates features of the example pressure lock retention fastener utilized to fasten together the two panel structures in accordance with the techniques for using the fastener assembly.
Figure 9:
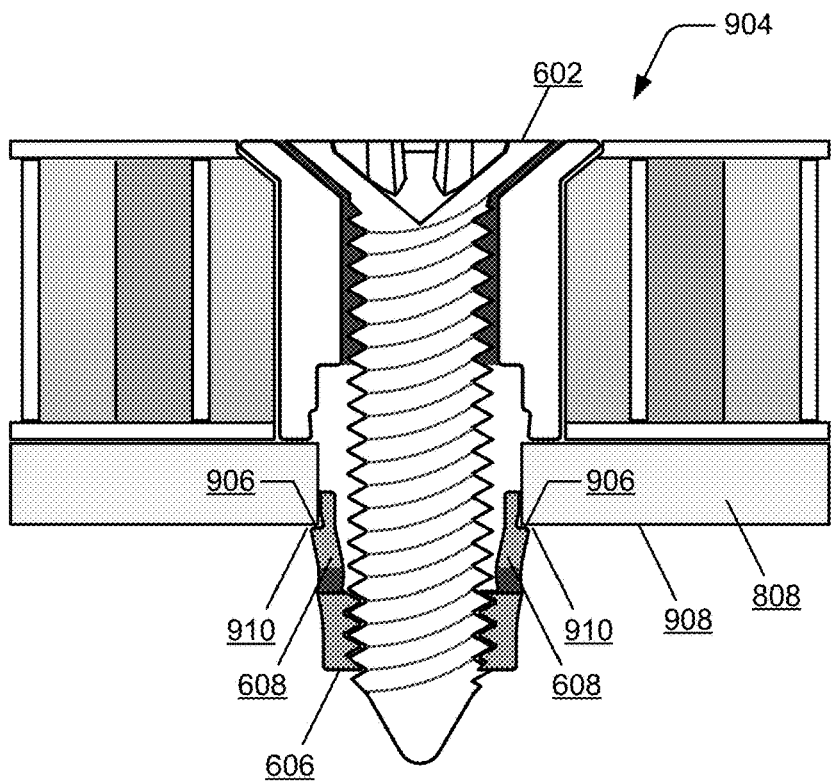

As next shown at 820 in the assembly sequence, a screwdriver tip can be used to apply pressure 822 and rotate the screw 602, as may be automated by use of a robot. The applied pressure 822 will unseat the pressure lock 606 and set the top of the screw 602 down flush with the top of the receptacle, as shown at 824. This is also shown in the larger detail view 826, where the flanges 608 of the pressure lock 606 un-detent from the receptacle 604, and the pressure lock 606 is extended down through the pre-drilled, aligned hole 810 in the second panel 808. This is also shown in a larger view 900 in FIG. 9, which illustrates features of the example pressure lock retention fastener 600 utilized to fasten together the two panel structures in accordance with the techniques for using the fastener.

The pressure 822 applied to the top of the screw 602 pushes the screw further into the receptacle 604 to unseat the pressure lock 606 from the interior surface of the receptacle, extending a portion of the pressure lock through the pre-drilled, aligned hole 810 of the second panel 808. The flanges 608 of the pressure lock 606 pop-out through the bottom of the aligned hole 810 in the second panel 808, and the pressure lock comes to rest on the indented extensions 614, as shown at 902 (on both sides of the illustration). The indented extensions 614 exert pressure against the interior surface of the pre-drilled hole 810 in the second panel 808 effective to hold the pressure lock 606 in place against the second panel.

Further, the portion of the indented extensions 614 that remain in the pre-drilled hole 810 function as an anti-rotation feature of the fastener assembly. This allows the screw 602 to begin driving in while the indented extensions 614 of the flanges 608 on the pressure lock 606 hold the pressure lock from spinning, and an applied torque draws the pressure lock vertically back up to seat the pressure lock against the second panel 808. Even though the top of the screw 602 is flush at the top of the first panel 806, the screw rotation continues to activate the pressure lock 606 to pull it up from the bottom and tight against the structure of the lower, second panel 808. With the application of torque as described below, a torque seating moment is established.

As next shown in the assembly sequence at 828 in FIG. 8, a screwdriver can continue to be used (e.g., as may be automated by use of a robot) to rotate the screw 602 in the receptacle 604 and torque the pressure lock 606 up against the second panel 808, as shown at 830. This is also shown in the larger detail view 832, where the screw 602 is rotated to draw the pressure lock 606 back and up tight against the structure of the bottom, second panel 808, as shown at 834. This is also shown in a larger view 904 in FIG. 9, which illustrates features of the pressure lock 606 of the example fastener assembly. Notably, the flanges 608 of the pressure lock 606 each include a detent surface 906 that is designed to contact the exterior surface 908 of the second panel 808 around the pre-drilled hole 810 with the pressure lock 606 torqued up against the second panel, as shown at 910 (on both sides of the illustration). The complete installation of the fastener assembly as described herein can all be automated to happen in approximately ten seconds or less, and the pressure lock 606 of the fastener assembly will remain in the position as shown in the larger view 904 in FIG. 9.

Further, the indented extensions 614 of the flanges 608 of the pressure lock 606 are under a pressure load (or spring load) at the attachment joint, and the pressure exerted by the indented extensions 614 of the flanges 608 pressing out against the interior surface of the pre-drilled hole 810 will hold the pressure lock 606 in place on the bottom side of the second panel 808, even though the screw might be backed out and removed. The indented extensions 614 of the flanges 608 hold the pressure lock 606 in place against the second panel 808 when the screw 602 is removed from the receptacle 604 and fastener assembly.

As noted in the description above, the flanges 608 transition from the receptacle 604 into the pre-drilled hole 810 in the second panel 808 (e.g., or other structural element) and the indented extensions 614 of the flanges 608 remain engaged in the pre-drilled hole 810 as a form of secondary retention of the pressure lock 606 to the structural element. The receptacle 604 remains in the pre-drilled hole 804 in the first panel 806, and the pressure lock 606 will remain expanded in and under the pre-drilled hole 810 in the second panel 808, while the screw 602 can be removed and reinstalled back through the first panel (e.g., through the receptacle 604) into the structure underneath, back into the pressure lock 606, and driven back down to re-torque the fastener assembly. This is a reusable fastener assembly, but after x-number of uses (e.g., approximately five uses in some applications), a tool may be used to pop the pressure lock 606 down and out of the pre-drilled hole 810 in the second panel 808, and easily replaced with a whole new fastener assembly of the pressure lock retention fastener 600.

Figure 10:
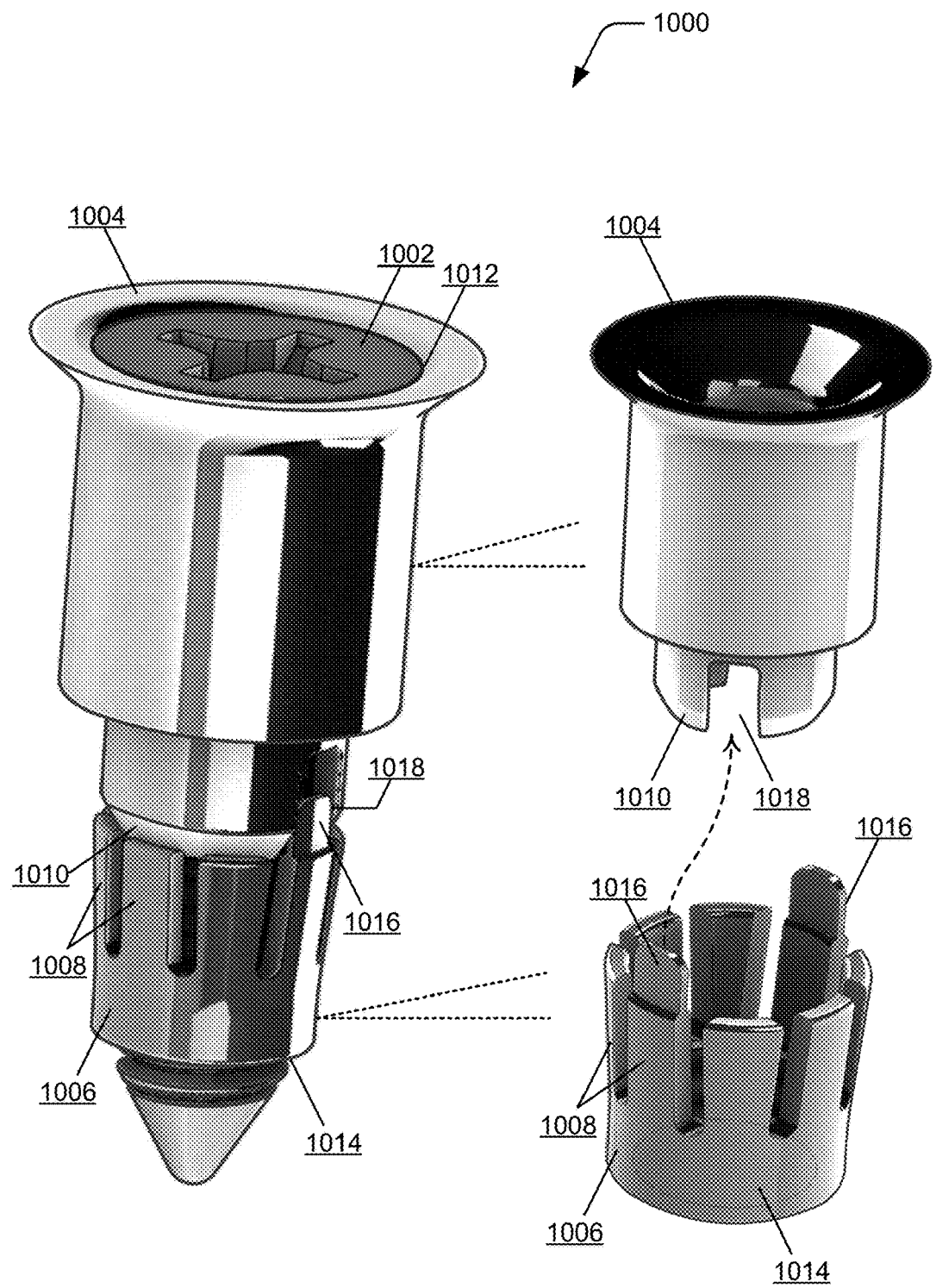
FIG. 10 illustrates another example assembly of a pressure lock retention fastener in accordance with aspects and features of the described fastener assembly.

FIG. 10 illustrates another example assembly of a pressure lock retention fastener 1000 in accordance with aspects and features of the fastener assembly. The pressure lock retention fastener 1000 can be pre-assembled and shipped for use as a ready-to-use assembly that includes a screw 1002 and a receptacle 1004, as well as a pressure lock 1006 (also referred to herein as the "pressure lock nut") with flanges 1008 that are pressure loaded (e.g., spring loaded). In this example, the flanges 1008 are spaced at multiple locations around the pressure lock 1006, and are designed to expand in a deployed assembly state of the fastener. The pressure lock 1006 is held in place against a beveled edge 1010 of the receptacle 1004 by the screw 1002. The pressure lock 1006 and the receptacle 1004 are seated together and ready for installation in the ready-to-use assembly state of the fastener assembly, as shown in FIG. 10.

In implementations, the assembly of the pressure lock retention fastener 1000 includes the receptacle 1004, and the screw 1002 is inserted through a top end 1012 of the receptacle 1004. The fastener assembly also includes the pressure lock 1006, which is threaded and designed to engage the screw at a bottom end 1014 of the pressure lock 1006. The receptacle 1004 has the beveled edge 1010 that exerts an outward force against the flanges 1008 of the pressure lock 1006 when the screw 1002 is torqued down. The flanges 1008 of the pressure lock 1006 expand outward as screw rotation turns the screw 1002, thus drawing the flanges 1008 up against the beveled edge 1010, which forces the flanges out. The pressure lock 1006 also includes lock tabs 1016 that engage respective lock-tab slots 1018 in the receptacle 1004 effective to prevent the receptacle 1004 and the pressure lock 1006 from turning independently of each other, such as when the screw 1002 is torqued down.

Similar to the assembly of the pressure lock retention fastener 600 as shown and described with reference to FIG. 6, the assembly of the pressure lock retention fastener 1000 is installable into pre-drilled or pre-stamped holes through first and second panels to be fastened together, as further shown and described with reference to FIG. 8. The pressure lock 1006 of the fastener assembly can be extended through the pre-drilled, aligned hole of the second panel. A torque can then be applied to seat the flanges 1008 of the pressure lock 1006 up against the exterior surface of the second panel effective to fasten the first and second panels together.

In aspects of the pressure lock retention fastener 1000 as an assembly, the receptacle 1004 is not threaded, allowing insertion of the screw 1002 into the top end 1012 of the receptacle 1004 and through to the bottom end 1014 of the pressure lock 1006, and the screw 1002 engages the pressure lock. The pressure lock 1006 then holds the screw 1002 in the receptacle 1004 such that the pressure lock retention fastener is a ready-to-use assembly. Notably, the pressure lock 1006 is not an expanding nut, but rather, is a straight cut type of nut having the flanges 1008 that are drawn into place and secured against a panel with a torque requirement. The pressure lock retention fastener 1000 has the aspects of retention via pressure for deployment of the pressure lock, and the pressure lock retention fastener can be deployed as an assembly unit in a robotic or automated process as a fastener assembly for a true top-down fastener solution.

In implementations, multiple pressure lock retention fasteners 1000 can be used to build floor panels, such as in an aircraft, with a robot that has an automated belt feed system, where the robot can grasp a ready-to-use assembly of a pressure lock retention fastener in a tool. The robot can grasp the receptacle 1004 of the assembly, use an automatic gluing mechanism to spin the whole fastener around once and apply glue to it, such as on the external, outer diameter of the receptacle. The robot can then place the fastener assembly into a prepared, pre-drilled hole in a floor panel with a structural beam underneath the floor panel. The floor panel and the structural beam are pre-drilled or pre-stamped with holes that are ready to have an assembly of the pressure lock retention fastener 1000 installed, and the fastener assembly can be placed in the pre-drilled hole and seated with the prescribed amount of glue applied to the receptacle 1004 of the fastener.

As described in more detail below, and with reference to the feature of pressure in deployment, the fastener assembly is delivered for use with the pressure lock 1006 held in position with the receptacle 1004, which also secures the screw 1002 loosely in-place in the fastener assembly. These can be pre-assembled by an automated system that aligns the two pieces together and inserts the screw. Installation can be automated for robotic concurrent single side installation, with concurrent meaning installing the glue joints, fastener assembly, and final installation all together, as in glue, plus fastener, plus final torque. Notably, the glue feature is optional, but can be used to provide extra strength and customizability for sheer loads and various customer requirements.

Figure 11:
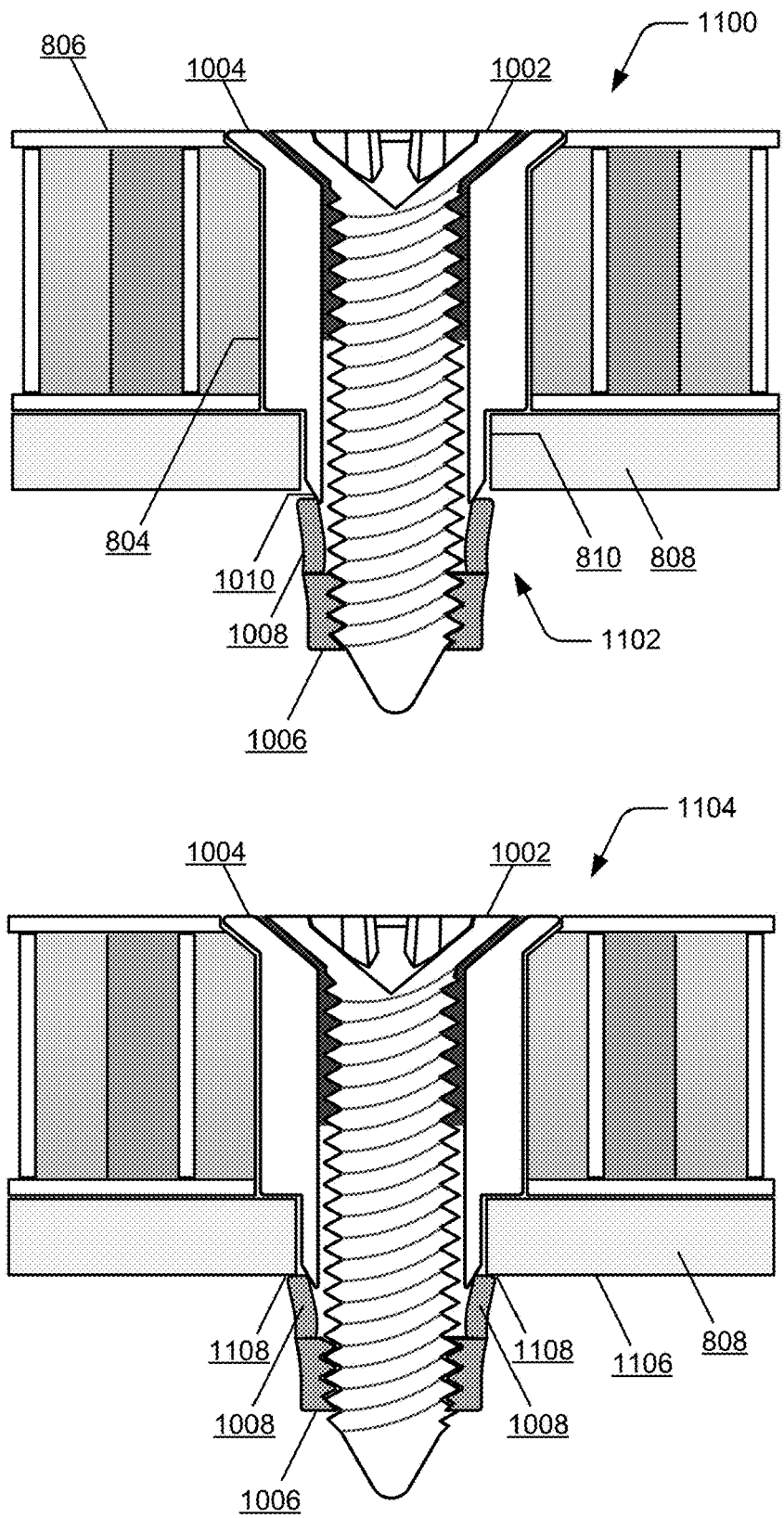
FIG. 11 further illustrates features of the example pressure lock retention fastener utilized to fasten together the two panel structures in accordance with the techniques for using the fastener assembly.

FIG. 11 illustrates features 1100 of the example pressure lock retention fastener 1000 utilized to fasten together two panel structures in accordance with the techniques for using the fastener. The assembly of the pressure lock retention fastener 1000 can be placed in the pre-drilled or pre-stamped fastener hole 804 in the first panel 806, with the receptacle 1004 being sized with a diameter for insertion into the pre-drilled, fastener hole through the first panel. The second panel 808 also has a pre-drilled or pre-stamped hole 810 that aligns with the fastener hole 804 in the first panel 806, and the aligned hole 810 in the second panel 808 accommodates the pressure lock 1006 of the fastener assembly. The receptacle 1004 is sized with a diameter designed for insertion into the fastener hole 804 through the first panel 806, and the receptacle 1004 sets flush with the top of the first panel.

As described above and shown in this example, the first panel 806 may be a floor panel, or any other type of panel or structure. Notably, the floor panels of most modern aircraft are a honeycomb and aluminum composite, as shown in the example illustration. The second panel 808 is a base piece, such as a floor structure or rail, to which the top floor panel is attached. In general terms, the pressure lock retention fastener 1000 is designed to fasten, attach, or adhere a panel to a structure, a support structure, a rail, another panel, and the like. The pressure lock retention fastener 1000 can be installed vertical, horizontal, upside down, etc. It is a very versatile fastener assembly, and can likely be used in every industry, including automotive, aerospace, construction, manufacturing, etc.

In an assembly sequence, a screwdriver tip can be used to rotate the screw 1002, as may be automated by use of a robot, and the top of the screw 1002 will set down flush with the top of the receptacle 1004. The pressure lock 1006 is extended down through the pre-drilled aligned hole 810 in the second panel 808, and the flanges 1008 of the pressure lock 1006 push through the bottom of the aligned hole 810 in the second panel 808, as shown at 1102 (on both sides of the illustration). The receptacle 1004 has the beveled edge 1010 that exerts an outward force against the flanges 1008 of the pressure lock 1006 when the screw 1002 is torqued down. The flanges 1008 of the pressure lock 1006 expand outward as the screw 1002 turns drawing the flanges 1008 up against the beveled edge 1010, which forces the flanges out.

As shown in the assembly sequence at 1104, the screw 1002 can continue to be driven in, and an applied torque draws the pressure lock 1006 vertically back up to seat the flanges 1008 of the pressure lock against the exterior surface 1106 of the second panel 808 (as shown at 1108). Even though the top of the screw 1002 is flush at the top of the first panel 806, the screw rotation continues to activate the pressure lock 1006 to pull it up from the bottom and tighten against the structure of the lower, second panel 808. The flanges 1008 of the pressure lock 1006 each contact the exterior surface 1106 of the second panel 808 around the pre-drilled hole 810 with the pressure lock 1006 torqued up against the second panel, and the pressure lock 1006 of the fastener assembly will remain in the fastened position.

Figure 12:
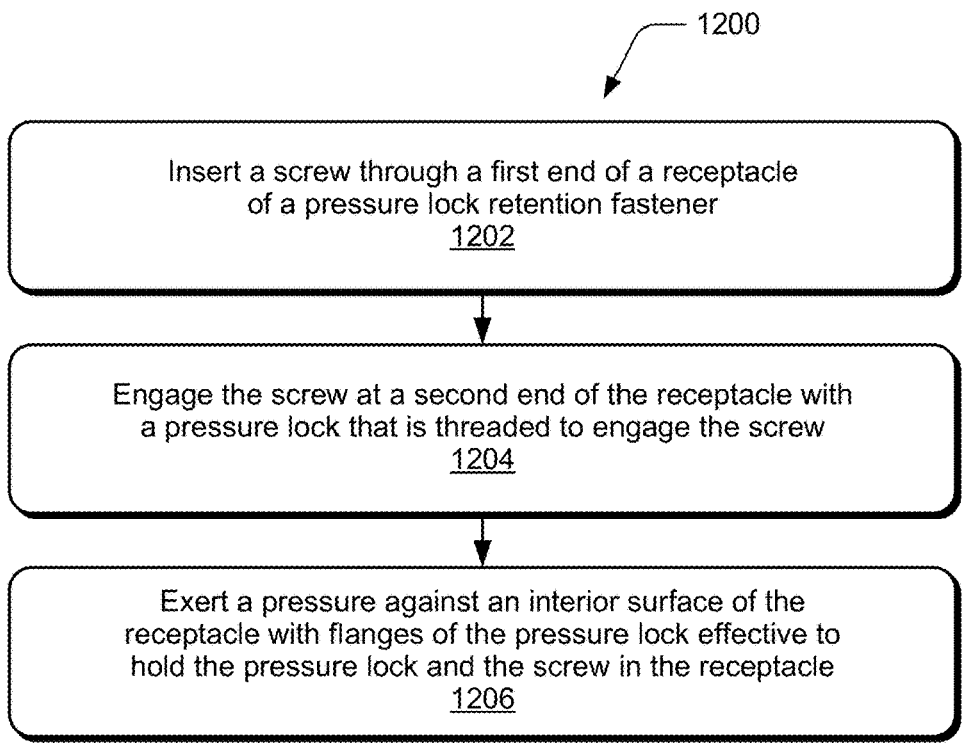
FIG. 12 illustrates an example method of a pressure lock retention fastener in accordance with one or more implementations.

FIG. 12 illustrates an example method 1200 for a pressure lock retention fastener as shown and described with reference to FIGS. 6-9. The order in which the method is described is not intended to be construed as a limitation, and any number or combination of the method operations can be combined in any order to implement a method, or an alternate method.

At 1202, a screw is inserted through a first end of a receptacle of a pressure lock retention fastener, and at 1204, the screw is engaged at a second end of the receptacle with a pressure lock that is threaded to engage the screw. For example, the assembly of the pressure lock retention fastener 600 includes the receptacle 604, and includes the screw 602 inserted through the first end 610 of the receptacle 604. The fastener assembly also includes the pressure lock 606, which is threaded and designed to engage the screw at the second end 612 of the receptacle 604. In implementations of the fastener assembly, the receptacle 604 is not threaded, allowing insertion of the screw 602 through the first end 610 of the receptacle 604 to the second end 612 of the receptacle, engaging the pressure lock 606. The pressure lock 606 then holds the screw 602 in the receptacle 604 such that the pressure lock retention fastener is a ready-to-use assembly. The pressure lock retention fastener 600 is designed for installation as an assembly into pre-drilled or pre-stamped fastener holes through panels to be fastened together.

At 1206, a pressure is exerted against an interior surface of the receptacle with flanges of the pressure lock effective to hold the pressure lock and the screw in the receptacle. For example, the flanges 608 of the pressure lock 606 each exert a pressure against an interior surface of the receptacle 604 effective to hold the pressure lock 606 and the screw 602 in the receptacle. In implementations, the flanges 608 of the pressure lock 606 engage the first detent 710 in the second end 612 of the receptacle 604 and exert a pressure against the interior surface of the first detent in the receptacle. Similarly, the flanges 608 of the pressure lock 606 include the indented extensions 614 that engage the second detent 712 in the second end 612 of the receptacle 604 and exert the pressure against the interior surface of the second detent in the receptacle. As illustrated, the flanges 608 of the pressure lock 606 are spring loaded, and designed with a bend out and heat treated to a certain state, such that the flanges 608 and the indented extensions 614 can be compressed inward and locked into the detents in the receptacle 604.

Figure 13:
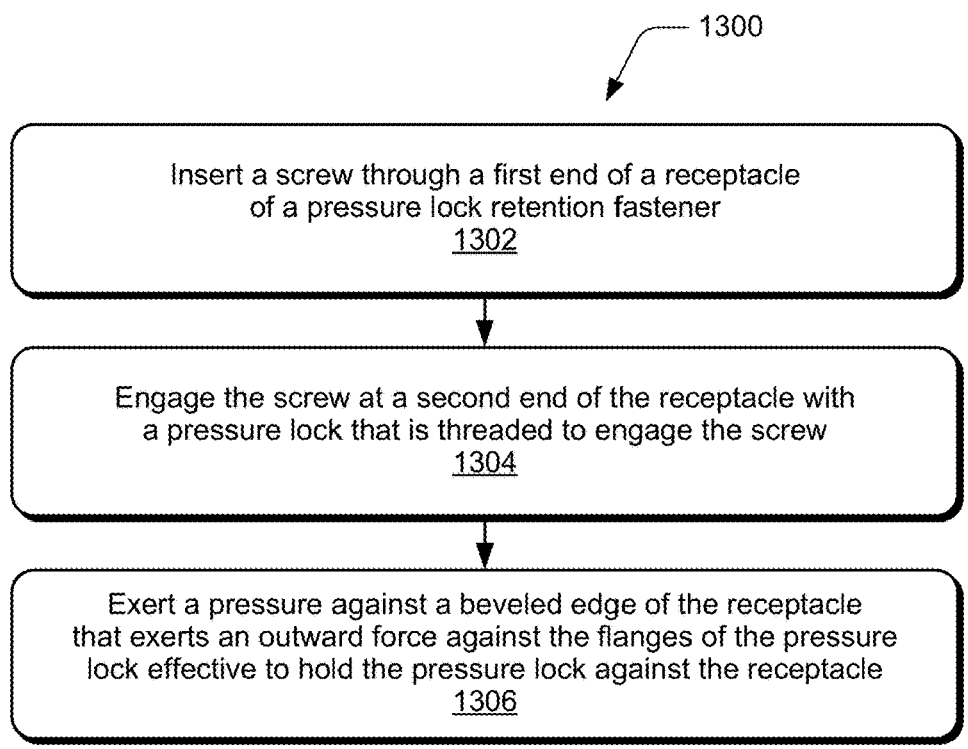
FIG. 13 illustrates an example method of a pressure lock retention fastener in accordance with one or more implementations.

FIG. 13 illustrates an example method 1300 for a pressure lock retention fastener as shown and described with reference to FIGS. 10 and 11. The order in which the method is described is not intended to be construed as a limitation, and any number or combination of the method operations can be combined in any order to implement a method, or an alternate method.

At 1302, a screw is inserted through a first end of a receptacle of a pressure lock retention fastener, and at 1304, the screw is engaged at a second end of the receptacle with a pressure lock that is threaded to engage the screw. For example, the pressure lock retention fastener 1000 includes the receptacle 1004, and includes the screw 1002 inserted through the top end 1012 of the receptacle 1004. The fastener assembly also includes the pressure lock 1006, which is threaded and designed to engage the screw at the bottom end 1014 of the pressure lock 1006. In implementations of the fastener assembly, the receptacle 1004 is not threaded, allowing insertion of the screw 1002 through the receptacle 1004 and engaging the pressure lock 1006. The pressure lock 1006 then holds the screw 1002 in the receptacle 1004 such that the pressure lock retention fastener is a ready-to-use assembly. The pressure lock retention fastener 1000 is designed for installation as an assembly into pre-drilled or pre-stamped fastener holes through panels to be fastened together.

At 1306, a pressure is exerted against a beveled edge of the receptacle that exerts an outward force against the flanges of the pressure lock effective to hold the pressure lock against the receptacle. For example, the beveled edge 1010 of the receptacle 1004 exerts an outward force against the flanges 1008 of the pressure lock 1006 effective to hold the pressure lock 1006 against the receptacle 1004 with the screw 1002 installed in the receptacle. As illustrated, the flanges 1008 of the pressure lock 1006 are spring loaded, and designed with a bend out and heat treated to a certain state, such that the flanges 1008 can be pressure loaded to expand outward.

Figure 14:
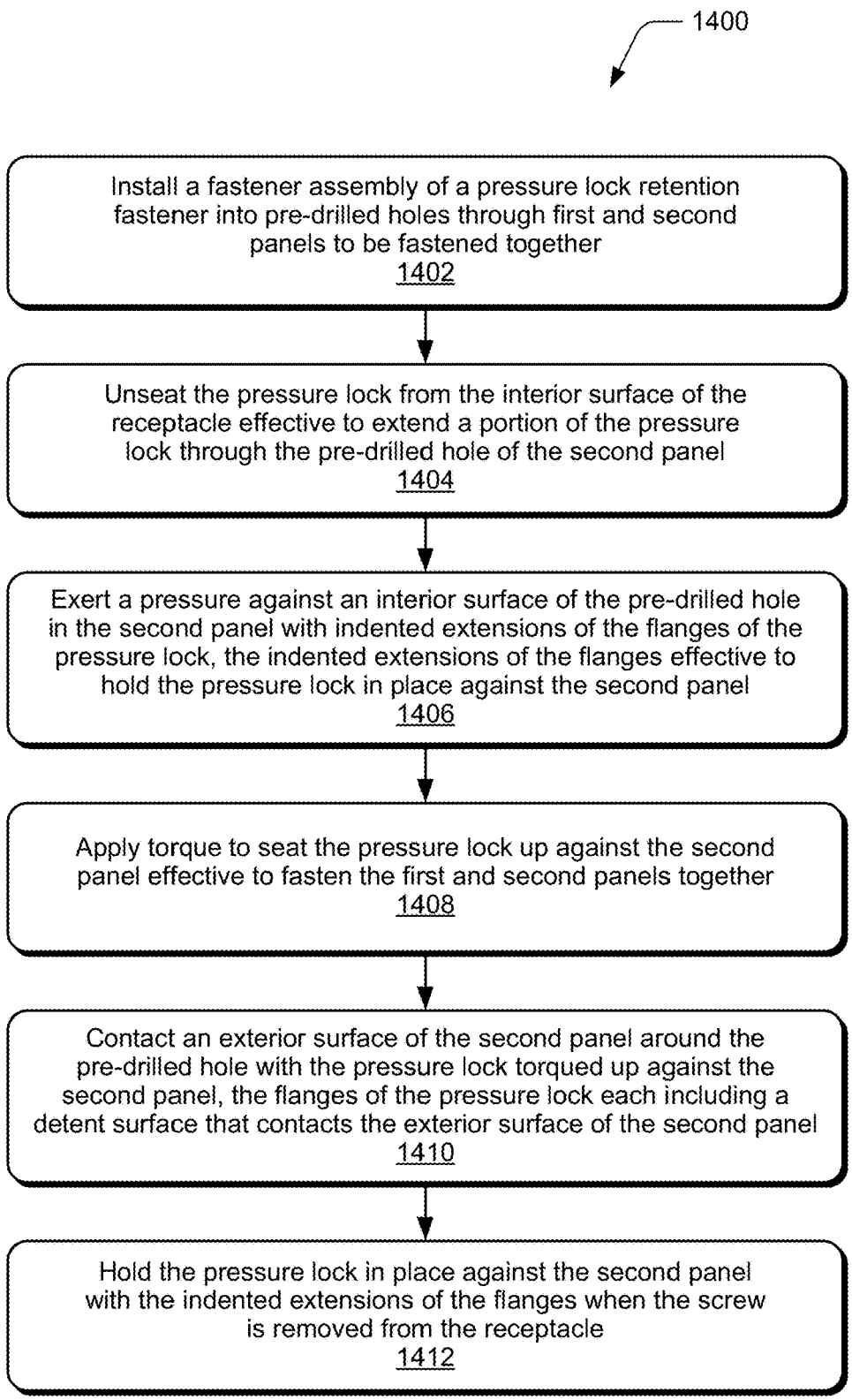
FIG. 14 illustrates an example method of a pressure lock retention fastener in accordance with one or more implementations.

FIG. 14 illustrates an example method 1400 for a pressure lock retention fastener as shown and described with reference to FIGS. 6-11. The order in which the method is described is not intended to be construed as a limitation, and any number or combination of the method operations can be combined in any order to implement a method, or an alternate method.

At 1402, an assembly of the pressure lock retention fastener is installed into a pre-drilled hole through first and second panels to be fastened together. For example, the pressure lock retention fastener 600 is shown at 802 being placed in the pre-drilled hole 804 in the first panel 806, with the receptacle 604 being of a diameter for insertion into the pre-drilled hole through the first panel. The second panel 808 also has the pre-drilled hole 810 that aligns with the pre-drilled hole 804 in the first panel 806, and the pre-drilled hole 810 in the second panel 808 accommodates the pressure lock 606 of the fastener assembly. Similarly, the assembly of the pressure lock retention fastener 1000 can be placed in the pre-drilled hole 804 in the first panel 806, with the receptacle 1004 being of a diameter for insertion into the pre-drilled hole through the first panel. The second panel 808 also has the pre-drilled hole 810 that aligns with the pre-drilled hole 804 in the first panel 806, and the pre-drilled hole 810 in the second panel 808 accommodates the pressure lock 1006 of the fastener assembly.

At 1404, the pressure lock is unseated from the interior surface of the receptacle effective to extend a portion of the pressure lock through the pre-drilled hole of the second panel. For example, the pressure 822 is applied on the screw 602 as shown at 820 to push the screw further into the receptacle, which will unseat the pressure lock 606 from the interior surface of the receptacle 604 and set the top of the screw 602 down flush with the top of the receptacle, as shown at 824. The flanges 608 of the pressure lock 606 un-detent from the receptacle 604, and the pressure lock 606 is extended down through the pre-drilled hole 810 in the second panel 808. Similarly, the screw 1002 can be rotated, and the top of the screw 1002 will set down flush with the top of the receptacle 1004. The pressure lock 1006 is extended down through the pre-drilled hole 810 in the second panel 808, and the flanges 1008 of the pressure lock 1006 push through the bottom of the pre-drilled hole 810 in the second panel 808.

At 1406, pressure is exerted against an interior surface of the pre-drilled hole in the second panel with the indented extensions of the flanges of the pressure lock, the indented extensions of the flanges effective to hold the pressure lock in place against the second panel. For example, the flanges 608 of the pressure lock 606 pop-out through the bottom of the pre-drilled hole 810 in the second panel 808, and the pressure lock comes to rest on the indented extensions 614, as shown at 902 (on both sides of the illustration). The indented extensions 614 exert pressure against the interior surface of the pre-drilled hole 810 in the second panel 808 effective to hold the pressure lock 606 in place against the second panel.

At 1408, torque is applied to seat the pressure lock up against the second panel effective to fasten the first and second panels together, and at 1410, an exterior surface of the second panel is contacted around the pre-drilled hole with the pressure lock torqued up against the second panel, the flanges of the pressure lock each including a detent surface that contacts the exterior surface of the second panel. For example, the screw 602 is rotated in the receptacle 604 to apply torque and draw the pressure lock 606 up against the second panel 808, as shown at 830. The screw 602 is rotated to draw the pressure lock 606 back and up tight against the structure of the bottom, second panel 808, as shown at 834. The flanges 608 of the pressure lock 606 each include a detent surface 906 that is designed to contact the exterior surface 908 of the second panel 808 around the pre-drilled hole 810 with the pressure lock 606 torqued up against the second panel, as shown at 910 (on both sides of the illustration).

Similarly, the receptacle 1004 of the pressure lock retention fastener 1000 has the beveled edge 1010 that exerts an outward force against the flanges 1008 of the pressure lock 1006 when the screw 1002 is torqued down. The flanges 1008 of the pressure lock 1006 expand outward as the screw 1002 turns drawing the flanges 1008 up against the beveled edge 1010, which forces the flanges out. The screw 1002 can continue to be driven in, and an applied torque draws the pressure lock 1006 vertically back up to seat the flanges 1008 of the pressure lock against the bottom, exterior surface 908 of the second panel 808.

At 1412, the pressure lock is held in place against the second panel with the indented extensions of the flanges when the screw is removed from the receptacle. For example, the indented extensions 614 of the flanges 608 of the pressure lock 606 are under a pressure load (or spring load) at the attachment joint, and the pressure exerted by the indented extensions 614 of the flanges 608 pressing out against the interior surface of the pre-drilled hole 810 will hold the pressure lock 606 in place on the bottom side of the second panel 808, even though the screw might be backed out and removed. The indented extensions 614 of the flanges 608 hold the pressure lock 606 in place against the second panel 808 when the screw 602 is removed from the receptacle 604 and fastener assembly.

Although implementations of a pressure lock retention fastener have been described in language specific to features and/or methods, the appended claims are not necessarily limited to the specific features or methods described. Rather, the specific features and methods are disclosed as example implementations of a pressure lock retention fastener, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A fastener system, comprising: a pressure lock retention fastener to fasten panels together, the pressure lock retention fastener including: an insert sized for insertion into a fastener hole in a first panel; a threaded collet sized to slide in the insert and having expandable flanges that extend below the insert, the expandable flanges sized for insertion into an aligned hole in a second panel; and a screw installable through the insert to engage internal threads of the threaded collet, the screw having a smooth pin end configured to exert a force that pushes the expandable flanges outward as screw rotation drives the screw into the threaded collet, and ridge locks of the expandable flanges seating up against the second panel effective to fasten the first and second panels together; and a plate that is installable between the first and second panels, the plate including a slotted hole with anti-rotation tabs that engage slots between the expandable flanges of the threaded collet, the anti-rotation tabs of the slotted hole effective to prevent the pressure lock retention fastener from spinning in the fastener hole of the first panel and in the aligned hole in the second panel.

Alternatively or in addition to the above described fastener system, any one or combination of: the screw is rotatable to torque the ridge locks of the expandable flanges up to seat against an exterior surface of the second panel as the threaded collet is drawn up within the insert by the screw rotation. The insert includes internal tabs that engage the slots between the expandable flanges of the threaded collet, the internal tabs of the insert effective to prevent the insert and the threaded collet from spinning independently of each other. A threaded end of the screw and the threaded collet are concentric, and screw threads engage the internal threads of the threaded collet without binding the screw threads in the threaded collet. The expandable flanges include a preventative lock surface effective to prevent false positive lock engagements of the ridge locks. The preventative lock surface of an expandable flange extends below the ridge lock effective to prevent the ridge lock from engaging into a void space between the first and second panels.

A pressure lock retention fastener, comprising: an insert sized for insertion into a fastener hole in a first panel, the insert having an inner void space through the insert and a catch ridge extending inward into the inner void space; a threaded collet having an outer diameter sized to slide into the inner void space of the insert and held in place by the catch ridge in the insert, the threaded collet including expandable flanges that extend below the insert and the expandable flanges sized for insertion into an aligned hole in a second panel; and a screw installable through the inner void space of the insert and into the threaded collet, the screw having a threaded end that engages internal threads of the threaded collet and the screw having a smooth pin end configured to slide against the expandable flanges exerting a force that pushes the expandable flanges outward as screw rotation drives the screw into the threaded collet, the expandable flanges each having a ridge lock that seats up against the second panel effective to fasten the first and second panels together.

Alternatively or in addition to the above described pressure lock retention fastener, any one or combination of: the screw is rotatable to torque the ridge locks of the expandable flanges up to seat against an exterior surface of the second panel as the threaded collet is drawn up within the insert by the screw rotation. The insert includes internal tabs that engage slots between the expandable flanges of the threaded collet, the internal tabs of the insert effective to prevent the insert and the threaded collet from spinning independently of each other. The expandable flanges are sized for insertion into a slotted hole in a plate that is installable between the first and second panels, the slotted hole in the plate including anti-rotation tabs that engage the slots between the expandable flanges of the threaded collet, the anti-rotation tabs of the slotted hole effective to prevent the pressure lock retention fastener from spinning in the fastener hole of the first panel and in the aligned hole in the second panel. The threaded end of the screw and the threaded collet are concentric, and screw threads engage the internal threads of the threaded collet without binding the screw threads in the threaded collet. The ridge locks of the expandable flanges seat up against the second panel, and an expandable flange includes a preventative lock surface effective to prevent a false positive lock engagement of a ridge lock. The preventative lock surface of the expandable flange extends below the ridge lock effective to prevent the ridge lock from engaging into a void space between the first and second panels. The insert includes one or more air release vents to vent air pressure below the first and second panels that are fastened together.

A method for a pressure lock retention fastener, the method comprising: engaging screw threads of a screw by a threaded collet that slides within an inner void space of an insert, the screw being installable through the inner void space of the insert and into the threaded collet, the insert sized for insertion into a fastener hole in a first panel; pushing expandable flanges of the threaded collet outward by a smooth pin end of the screw as screw rotation drives the screw into the threaded collet, the expandable flanges extending below the insert and sized for insertion through an aligned hole in a second panel; and seating ridge locks of the expandable flanges up against an exterior surface of the second panel effective to fasten the first and second panels together, the ridge locks being positioned against the exterior surface of the second panel by said pushing the expandable flanges outward and the threaded collet being drawn up within the insert by the screw rotation.

Alternatively or in addition to the above described method, any one or combination of: preventing the insert and the threaded collet from spinning independently of each other by internal tabs on the insert that engage slots between the expandable flanges of the threaded collet; preventing the pressure lock retention fastener from spinning in the fastener hole of the first panel and in the aligned hole in the second panel by a slotted hole in a plate that is installable between the first and second panels, the slotted hole including anti-rotation tabs that engage the slots between the expandable flanges of the threaded collet; preventing false positive lock engagements of the ridge locks by preventative false lock surfaces of the expandable flanges, the preventative false lock surfaces extending below the ridge locks effective to prevent a ridge lock from engaging into a void space between the first and second panels; venting air pressure by one or more air release vents in the insert that vent the air pressure below the first and second panels that are fastened together. The screw threads and the threaded collet are concentric, and the screw threads engage internal threads of the threaded collet without binding the screw threads in the threaded collet.

A pressure lock retention fastener, comprising: a receptacle; a screw inserted through a first end of the receptacle; and a pressure lock designed to engage the screw at a second end of the receptacle, the pressure lock having flanges each configured to exert a pressure against an interior surface of the receptacle effective to hold the pressure lock and the screw in the receptacle.

Alternatively or in addition to the above described pressure lock retention fastener, any one or combination of: the receptacle is not threaded, allowing insertion of the screw through a center of the receptacle to engage the pressure lock that holds the screw in the receptacle such that the pressure lock retention fastener is a ready-to-use assembly. As the ready-to-use assembly, the flanges of the pressure lock engage a first detent in the second end of the receptacle and exert the pressure against the interior surface of the first detent in the receptacle; and the flanges of the pressure lock include indented extensions that engage a second detent in the second end of the receptacle and exert the pressure against the interior surface of the second detent in the receptacle. The pressure lock retention fastener is configured for installation as an assembly into pre-drilled holes through panels to be fastened together; the receptacle is sized for insertion into a pre-drilled hole through a first panel; the screw is configured to push through the receptacle to unseat the pressure lock from the interior surface of the receptacle, extending a portion of the pressure lock through a pre-drilled hole of a second panel; and the screw is rotatable to torque the pressure lock up against the second panel. The flanges of the pressure lock each include a detent surface configured to contact an exterior surface around the pre-drilled hole of the second panel with the pressure lock torqued up against an exterior surface of the second panel; and the flanges of the pressure lock include indented extensions configured to exert pressure against an interior surface of the pre-drilled hole in the second panel effective to hold the pressure lock in place against the second panel.

The invention claimed is:
1. A pressure lock retention fastener, comprising:
a receptacle;
a screw inserted through a first end of the receptacle; and
a pressure lock configured to engage the screw at a second end of the receptacle, the pressure lock having flanges each configured to exert a pressure against an interior surface of the receptacle to hold the pressure lock and the screw in the receptacle, and an assembly of the screw inserted through the receptacle and engaged in the pressure lock including one or more air release vents to vent air pressure from below the assembly.
2. The pressure lock retention fastener of claim 1, wherein the receptacle is not threaded, allowing insertion of the screw through a center of the receptacle to engage the pressure lock that holds the screw in the receptacle, configuring the pressure lock retention fastener as a ready-to-use assembly.

3. The pressure lock retention fastener of claim 2, wherein the ready-to-use assembly includes:
the flanges of the pressure lock engage a first detent in the second end of the receptacle and exert the pressure against the interior surface of the first detent in the receptacle; and
the flanges of the pressure lock include indented extensions that engage a second detent in the second end of the receptacle and exert the pressure against the interior surface of the second detent in the receptacle.

4. The pressure lock retention fastener of claim 1, wherein:
the pressure lock retention fastener is configured for installation as the assembly into pre-drilled holes through panels to be fastened together;
the receptacle is sized for insertion into a pre-drilled hole through a first panel;
the screw is configured to push through the receptacle to unseat the pressure lock from the interior surface of the receptacle, extending a portion of the pressure lock through a pre-drilled hole in a second panel; and
the screw is rotatable, torquing the pressure lock up against the second panel.

5. The pressure lock retention fastener of claim 4, wherein the assembly is vented configured to vent the air pressure below the first panel and the second panel that are fastened together.

6. The pressure lock retention fastener of claim 4, wherein:
the flanges of the pressure lock each include a detent surface configured to contact an exterior surface around the pre-drilled hole in the second panel with the pressure lock torqued up against the exterior surface of the second panel; and
the flanges of the pressure lock include indented extensions configured to exert pressure against an interior surface of the pre-drilled hole in the second panel, holding the pressure lock in place against the second panel.

7. The pressure lock retention fastener of claim 6, wherein the detent surface of each of the flanges of the pressure lock extend through the pre-drilled hole in the second panel, and the flanges expand outward to where the indented extensions of each of the flanges contact against the interior surface of the pre-drilled hole in the second panel.

8. The pressure lock retention fastener of claim 6, wherein the detent surface of each of the flanges is configured to seat against the exterior surface around the pre-drilled hole in the second panel as the pressure lock is drawn up by an install rotation of the screw.

9. A method for a pressure lock retention fastener, the method comprising:
holding, by a receptacle, a screw inserted through a first end of the receptacle;
engaging the screw, by a pressure lock, at a second end of the receptacle;
exerting, by flanges of the pressure lock, a pressure against an interior surface of the receptacle to hold the pressure lock and the screw in the receptacle; and
venting air pressure by one or more air release vents from below an assembly of the screw engaged in the pressure lock.

10. The method of claim 9, wherein the receptacle is not threaded, allowing insertion of the screw through a center of the receptacle to engage the pressure lock that holds the screw in the receptacle, configuring the pressure lock retention fastener as a ready-to-use assembly.

11. The method of claim 10, further comprising:
engaging, by the flanges of the pressure lock, a first detent in the second end of the receptacle that exerts the pressure against the interior surface of the first detent in the receptacle; and
engaging, by indented extensions of the flanges of the pressure lock, a second detent in the second end of the receptacle that exerts the pressure against the interior surface of the second detent in the receptacle.

12. The method of claim 9, wherein:
the pressure lock retention fastener installs as the assembly into pre-drilled holes through panels to be fastened together;
the receptacle is sized for insertion into a pre-drilled hole through a first panel;
the screw is configured to push through the receptacle to unseat the pressure lock from the interior surface of the receptacle, extending a portion of the pressure lock through a pre-drilled hole in a second panel; and
the screw is rotatable to torque the pressure lock up against the second panel.

13. The method of claim 12, further comprising:
venting the air pressure by the one or more air release vents that vent the air pressure below the first panel and the second panel that are fastened together.

14. The method of claim 12, wherein:
the flanges of the pressure lock each include a detent surface configured to contact an exterior surface around the pre-drilled hole in the second panel with the pressure lock torqued up against the exterior surface of the second panel; and
the flanges of the pressure lock include indented extensions configured to exert pressure against an interior surface of the pre-drilled hole in the second panel, holding the pressure lock in place against the second panel.

15. The method of claim 14, wherein the detent surface of each of the flanges of the pressure lock extend through the pre-drilled hole in the second panel, and the flanges expand outward to where the indented extensions of each of the flanges contact against the interior surface of the pre-drilled hole in the second panel.

16. The method of claim 14, wherein the detent surface of each of the flanges is configured to seat against the exterior surface around the pre-drilled hole in the second panel as the pressure lock is drawn up by an install rotation of the screw.

17. A pressure lock retention fastener, comprising:
a screw inserted through a receptacle;
a pressure lock configured to engage threads of the screw forming an assembly of the screw inserted through the receptacle and the screw engaged in the pressure lock;
flanges each configured to exert a pressure against an interior surface of the receptacle to hold the pressure lock and the screw in the receptacle; and
one or more air release vents to vent air pressure from below the assembly.

18. The pressure lock retention fastener of claim 17, wherein the receptacle is not threaded, and the threads of the screw engage internal threads of the pressure lock without binding.

19. The pressure lock retention fastener of claim 17, wherein:

the pressure lock retention fastener is configured for installation as an assembly into pre-drilled holes through a first panel and a second panel to be fastened together;

the receptacle is sized for insertion into a pre-drilled hole through the first panel;

the pressure lock is sized for insertion into a pre-drilled hole through the second panel;

the screw is configured to push through the receptacle to unseat the pressure lock from the interior surface of the receptacle, extending a portion of the flanges of the pressure lock through the pre-drilled hole in the second panel; and the screw is configured to torque the flanges of the pressure lock up against an exterior surface of the second panel.

20. The pressure lock retention fastener of claim 19, wherein:

the flanges of the pressure lock each include a detent surface configured to contact the exterior surface around the pre-drilled hole in the second panel with the pressure lock torqued up against the exterior surface of the second panel; and the flanges of the pressure lock include indented extensions configured to exert pressure against an interior surface of the pre-drilled hole in the second panel.

* * * * *